United States Patent
Xue et al.

(10) Patent No.: US 11,706,709 B2
(45) Date of Patent: Jul. 18, 2023

(54) MICRO SLEEP TECHNIQUES IN STAR TOPOLOGY SIDELINK COMMUNICATIONS

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Junyi Li, Fairless Hills, PA (US); Ozcan Ozturk, San Diego, CA (US); Chih-Hao Liu, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 17/360,697

(22) Filed: Jun. 28, 2021

(65) Prior Publication Data
US 2022/0053420 A1     Feb. 17, 2022

Related U.S. Application Data

(60) Provisional application No. 63/064,385, filed on Aug. 11, 2020.

(51) Int. Cl.
*H04W 52/02* (2009.01)

(52) U.S. Cl.
CPC .............. *H04W 52/0216* (2013.01)

(58) Field of Classification Search
CPC ............. H04W 52/0216; H04W 92/18; H04W 72/0446; H04W 52/028; H04W 52/0209; H04W 4/70; H04W 88/04; Y02D 30/70
See application file for complete search history.

(56) References Cited

FOREIGN PATENT DOCUMENTS

| EP | 3860279 A1 * | 8/2021 | ............ H04W 28/18 |
|---|---|---|---|
| WO | WO-2018064477 A1 * | 4/2018 | |
| WO | WO-2019201165 A1 * | 10/2019 | ............ H04L 5/0007 |
| WO | WO-2020064176 A1 * | 4/2020 | ............ H04L 5/0007 |
| WO | WO-2020066583 A1 | 4/2020 | |
| WO | WO-2020135159 A1 | 7/2020 | |

OTHER PUBLICATIONS

International Search Report and Written Opinion—PCT/US2021/039725—ISA/EPO—dated Oct. 26, 2021.

* cited by examiner

*Primary Examiner* — Ayanah S George
(74) *Attorney, Agent, or Firm* — Qualcomm Incorporated

(57) ABSTRACT

Methods, systems, and devices for wireless communications are described. A hub user equipment (UE) in a star topology may broadcast to a set of peripheral UEs indicating slots when the hub UE will not be in a transmission mode. The hub UE may broadcast a slot format indication to the peripheral UEs to indicate operating modes in a set of slots. In a first group of slots, the hub UE may operate in a forward mode, transmitting sidelink communications to the peripheral UEs. In a second group of slots, the hub UE may operate in a reverse mode, receiving sidelink communications from the peripheral UEs. In slots when the hub UE operates in the reverse mode, if a peripheral UE does not have data or control information, the peripheral UE may enter a sleep mode in one or more slots of the second group to save power.

15 Claims, 13 Drawing Sheets

MICRO SLEEP TECHNIQUES IN STAR TOPOLOGY SIDELINK COMMUNICATIONS

CROSS REFERENCE

The present Application for Patent claims the benefit of U.S. Provisional Patent Application No. 63/064,385 by XUE et al., entitled "MICRO SLEEP TECHNIQUES IN STAR TOPOLOGY SIDELINK COMMUNICATIONS," filed Aug. 11, 2020, assigned to the assignee hereof, and expressly incorporated by reference herein.

FIELD OF TECHNOLOGY

The following relates to wireless communications, including micro sleep techniques in star topology sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The present disclosure relates to methods, systems, devices, and apparatuses that support micro sleep techniques in star topology sidelink communications. Generally, the described techniques provide for enabling a hub user equipment (UE) to broadcast to a set of peripheral UEs in a star topology indicating slots when the hub UE will not be in a transmission mode, which may enable the peripheral UEs to enter a power-saving sleep mode in slots when the hub UE is not transmitting. The hub UE may broadcast a slot format indication (SFI) to the peripheral UEs to indicate operating modes in a set of slots. In one aspect, in a first group of slots, the hub UE may operate in a "forward" mode, transmitting sidelink communications to the peripheral UEs. In a second group of slots, the hub UE may operate in a "reverse" mode, receiving sidelink communications from the peripheral UEs. In some aspects, the hub UE may operate in a "not available" mode in a third group of slots, where the hub UE operates in neither a transmission mode nor a reception mode with respect to the peripheral UEs. In slots when the hub UE operates in the "reverse" mode, if a peripheral UE does not have data or control information, the peripheral UE may enter a sleep mode (e.g., conduct a micro sleep) in one or more slots of the second group to save power. In some aspects, the SFI may be arranged as an array indicating the slots and corresponding operating modes. In some aspects, the SFI may be broadcast in a sidelink control information (SCI) message or higher-layer signaling.

A method of wireless communications implemented by a first UE is described. The method may include determining, for a set of slots, respective operation modes for sidelink communications, each operation mode selected from a set of operation modes, transmitting, to a set of second UEs, a slot format indication for the set of slots that indicates the respective operation modes, and communicating with one or more second UEs of the set of second UEs in one or more slots of the set of slots based on the transmitting the slot format indication.

An apparatus for wireless communications implemented by a first UE is described. The apparatus may include a processor, memory coupled with the processor, and instructions stored in the memory. The instructions may be executable by the processor to cause the apparatus to determine, for a set of slots, respective operation modes for sidelink communications, each operation mode selected from a set of operation modes, transmit, to a set of second UEs, a slot format indication for the set of slots that indicates the respective operation modes, and communicate with one or more second UEs of the set of second UEs in one or more slots of the set of slots based on the transmitting the slot format indication.

Another apparatus for wireless communications implemented by a first UE is described. The apparatus may include means for determining, for a set of slots, respective operation modes for sidelink communications, each operation mode selected from a set of operation modes, transmitting, to a set of second UEs, a slot format indication for the set of slots that indicates the respective operation modes, and communicating with one or more second UEs of the set of second UEs in one or more slots of the set of slots based on the transmitting the slot format indication.

A non-transitory computer-readable medium storing code for wireless communications implemented by a first UE is described. The code may include instructions executable by a processor to determine, for a set of slots, respective operation modes for sidelink communications, each operation mode selected from a set of operation modes, transmit, to a set of second UEs, a slot format indication for the set of slots that indicates the respective operation modes, and communicate with one or more second UEs of the set of second UEs in one or more slots of the set of slots based on the transmitting the slot format indication.

Some examples of the method, apparatuses, and non-transitory computer-readable medium described herein may further include operations, features, means, or instructions for generating an array indicating the set of slots and the respective operation modes, where the slot format indication includes the array.

Some examples of the method, apparatuses, and non-transitory computer-readable medium described herein may further include operations, features, means, or instructions for identifying a first operation mode corresponding to a first subset of the set of slots and a second operation mode corresponding to a second subset of the set of slots based on the determining the respective operation modes for the set of slots, and transmitting a first sidelink transmission to a second UE of the set of second UEs in one or more slots of the first subset based on the identifying the first operation mode.

Some examples of the method, apparatuses, and non-transitory computer-readable medium described herein may further include operations, features, means, or instructions for receiving a second sidelink transmission from the second UE of the set of second UEs in one or more slots of the second subset based on the identifying the second operation mode.

In some examples of the method, apparatuses, and non-transitory computer-readable medium described herein, the transmitting the slot format indication may include operations, features, means, or instructions for transmitting the slot format indication in a sidelink control information message.

In some examples of the method, apparatuses, and non-transitory computer-readable medium described herein, the transmitting the slot format indication in a sidelink control information message may include operations, features, means, or instructions for identifying control information in the sidelink control information message, and appending the slot format indication to the control information in the sidelink control information message based on determining that a modulation and coding scheme for the sidelink control information message may be compatible with transmitting the slot format indication.

In some examples of the method, apparatuses, and non-transitory computer-readable medium described herein, the sidelink control information message includes an indication of the slot format indication and a network identifier associated with the first UE and the set of second UEs.

Some examples of the method, apparatuses, and non-transitory computer-readable medium described herein may further include operations, features, means, or instructions for identifying a configured grant occasion associated with a slot of the set of slots, where the configured grant occasion schedules a sidelink communication with a second UE of the set of second UEs in the slot, determining a mismatch between the scheduled sidelink communication and the respective operation mode for the slot, and refraining from communicating the sidelink communication with the second UE in the slot based on the determining the mismatch.

Some examples of the method, apparatuses, and non-transitory computer-readable medium described herein may further include operations, features, means, or instructions for identifying a third operation mode corresponding to a third subset of the set of slots based on the determining the respective operation modes for the set of slots, and refraining from communicating with the set of second UEs in one or more slots of the third subset based on the identifying the third operation mode.

Some examples of the method, apparatuses, and non-transitory computer-readable medium described herein may further include operations, features, means, or instructions for deactivating one or more transmission components at the first UE in the one or more slots of the third subset based on the identifying the third operation mode, where the refraining from communicating with the set of second UEs in the one or more slots of the third subset may be further based on the deactivating the one or more transmission components.

Some examples of the method, apparatuses, and non-transitory computer-readable medium described herein may further include operations, features, means, or instructions for transmitting, to the set of second UEs, a feedback indication that indicates a fourth subset of the set of slots for feedback associated with the sidelink communications, identifying the respective operation mode for each slot of the fourth subset based on the determining the respective operation modes for the set of slots, and communicating the feedback with one or more second UEs of the set of second UEs in one or more slots of the fourth subset based on the transmitting the feedback indication and the identifying the respective operation modes.

In some examples of the method, apparatuses, and non-transitory computer-readable medium described herein, the determining the respective operation modes for the set of slots may include operations, features, means, or instructions for determining respective operation modes for a set of subbands in each slot of the set of slots, where the slot format indication for the set of slots indicates the respective operation modes for the set of subbands.

In some examples of the method, apparatuses, and non-transitory computer-readable medium described herein, the transmitting the slot format indication may include operations, features, means, or instructions for transmitting the slot format indication in each sub-channel of a set of sub-channels.

In some examples of the method, apparatuses, and non-transitory computer-readable medium described herein, the transmitting the slot format indication may include operations, features, means, or instructions for transmitting the slot format indication in a medium access control control element, a radio resource control message, or any combination thereof.

A method of wireless communications implemented by a second UE is described. The method may include receiving, from a first UE, a slot format indication that indicates respective operation modes for sidelink communications in a set of slots, each operation mode selected from a set of operation modes, determining a first operation mode corresponding to a first subset of the set of slots and a second operation mode corresponding to a second subset of the set of slots based on the receiving the slot format indication, and communicating with the first UE in one or more slots of the set of slots based on the determining the first operation mode and the second operation mode.

An apparatus for wireless communications implemented by a second UE is described. The apparatus may include a processor, memory coupled with the processor, and instructions stored in the memory. The instructions may be executable by the processor to cause the apparatus to receive, from a first UE, a slot format indication that indicates respective operation modes for sidelink communications in a set of slots, each operation mode selected from a set of operation modes, determine a first operation mode corresponding to a first subset of the set of slots and a second operation mode corresponding to a second subset of the set of slots based on the receiving the slot format indication, and communicate with the first UE in one or more slots of the set of slots based on the determining the first operation mode and the second operation mode.

Another apparatus for wireless communications implemented by a second UE is described. The apparatus may include means for receiving, from a first UE, a slot format indication that indicates respective operation modes for sidelink communications in a set of slots, each operation mode selected from a set of operation modes, determining a first operation mode corresponding to a first subset of the set of slots and a second operation mode corresponding to a second subset of the set of slots based on the receiving the slot format indication, and communicating with the first UE in one or more slots of the set of slots based on the determining the first operation mode and the second operation mode.

A non-transitory computer-readable medium storing code for wireless communications implemented by a second UE is described. The code may include instructions executable by a processor to receive, from a first UE, a slot format indication that indicates respective operation modes for sidelink communications in a set of slots, each operation mode selected from a set of operation modes, determine a first operation mode corresponding to a first subset of the set of slots and a second operation mode corresponding to a second subset of the set of slots based on the receiving the slot format indication, and communicate with the first UE in one or more slots of the set of slots based on the determining the first operation mode and the second operation mode.

Some examples of the method, apparatuses, and non-transitory computer-readable medium described herein may further include operations, features, means, or instructions for identifying an array indicating the set of slots and the respective operation modes, where the slot format indication includes the array.

Some examples of the method, apparatuses, and non-transitory computer-readable medium described herein may further include operations, features, means, or instructions for receiving, from the first UE, a first sidelink transmission in one or more slots of the first subset based on the determining the first operation mode.

Some examples of the method, apparatuses, and non-transitory computer-readable medium described herein may further include operations, features, means, or instructions for transmitting, to the first UE, a second sidelink transmission in one or more slots of the second subset based on the determining the second operation mode.

Some examples of the method, apparatuses, and non-transitory computer-readable medium described herein may further include operations, features, means, or instructions for entering a sleep mode in at least a portion of a slot of the second subset based on the determining the second operation mode, and refraining from communicating with the first UE in at least the portion of the slot of the second subset based on the entering the sleep mode.

In some examples of the method, apparatuses, and non-transitory computer-readable medium described herein, the receiving the slot format indication may include operations, features, means, or instructions for receiving the slot format indication in a sidelink control information message.

In some examples of the method, apparatuses, and non-transitory computer-readable medium described herein, the sidelink control information message includes an indication of the slot format indication and a network identifier associated with the first UE and the second UE.

Some examples of the method, apparatuses, and non-transitory computer-readable medium described herein may further include operations, features, means, or instructions for identifying a configured grant occasion associated with a slot of the set of slots, where the configured grant occasion schedules a sidelink communication with the first UE in the slot, determining a mismatch between the scheduled sidelink communication and the respective operation mode for the slot, and refraining from communicating the sidelink communication with the first UE in the slot based on the determining the mismatch.

Some examples of the method, apparatuses, and non-transitory computer-readable medium described herein may further include operations, features, means, or instructions for entering a sleep mode in the slot based on the determining the mismatch, where the refraining from communicating with the first UE in the slot may be further based on the entering the sleep mode.

In some examples of the method, apparatuses, and non-transitory computer-readable medium described herein, the refraining from communicating with the first UE in the slot may include operations, features, means, or instructions for refraining from decoding the sidelink communication with the first UE in the slot based on the determining the mismatch.

Some examples of the method, apparatuses, and non-transitory computer-readable medium described herein may further include operations, features, means, or instructions for determining a third operation mode corresponding to a third subset of the set of slots based on the receiving the slot format indication, entering a sleep mode in at least a portion of a slot of the third subset based on the determining the third operation mode, and refraining from communicating with the first UE in at least the portion of the slot of the third subset based on the entering the sleep mode.

Some examples of the method, apparatuses, and non-transitory computer-readable medium described herein may further include operations, features, means, or instructions for receiving, from the first UE, a feedback indication that indicates a fourth subset of the set of slots for feedback associated with the sidelink communications, identifying the respective operation mode for each slot of the fourth subset based on the receiving the slot format indication, and communicating the feedback with the first UE in one or more slots of the fourth subset based on the receiving the feedback indication and the identifying the respective operation modes.

In some examples of the method, apparatuses, and non-transitory computer-readable medium described herein, the communicating the feedback with the first UE may include operations, features, means, or instructions for refraining from communicating the feedback with the first UE in a first slot of the fourth subset based on the identifying the respective operation mode for the first slot, and communicating the feedback with the first UE in a second slot of the fourth subset based on the identifying the respective operation mode for the second slot.

In some examples of the method, apparatuses, and non-transitory computer-readable medium described herein, the slot format indication indicates respective operation modes for a set of subbands in each slot of the set of slots.

In some examples of the method, apparatuses, and non-transitory computer-readable medium described herein, the receiving the slot format indication may include operations, features, means, or instructions for receiving the slot format indication in one or more sub-channels of a set of sub-channels.

In some examples of the method, apparatuses, and non-transitory computer-readable medium described herein, the receiving the slot format indication may include operations, features, means, or instructions for receiving the slot format indication in a medium access control control element, a radio resource control message, or any combination thereof.

DETAILED DESCRIPTION

Figure 1:
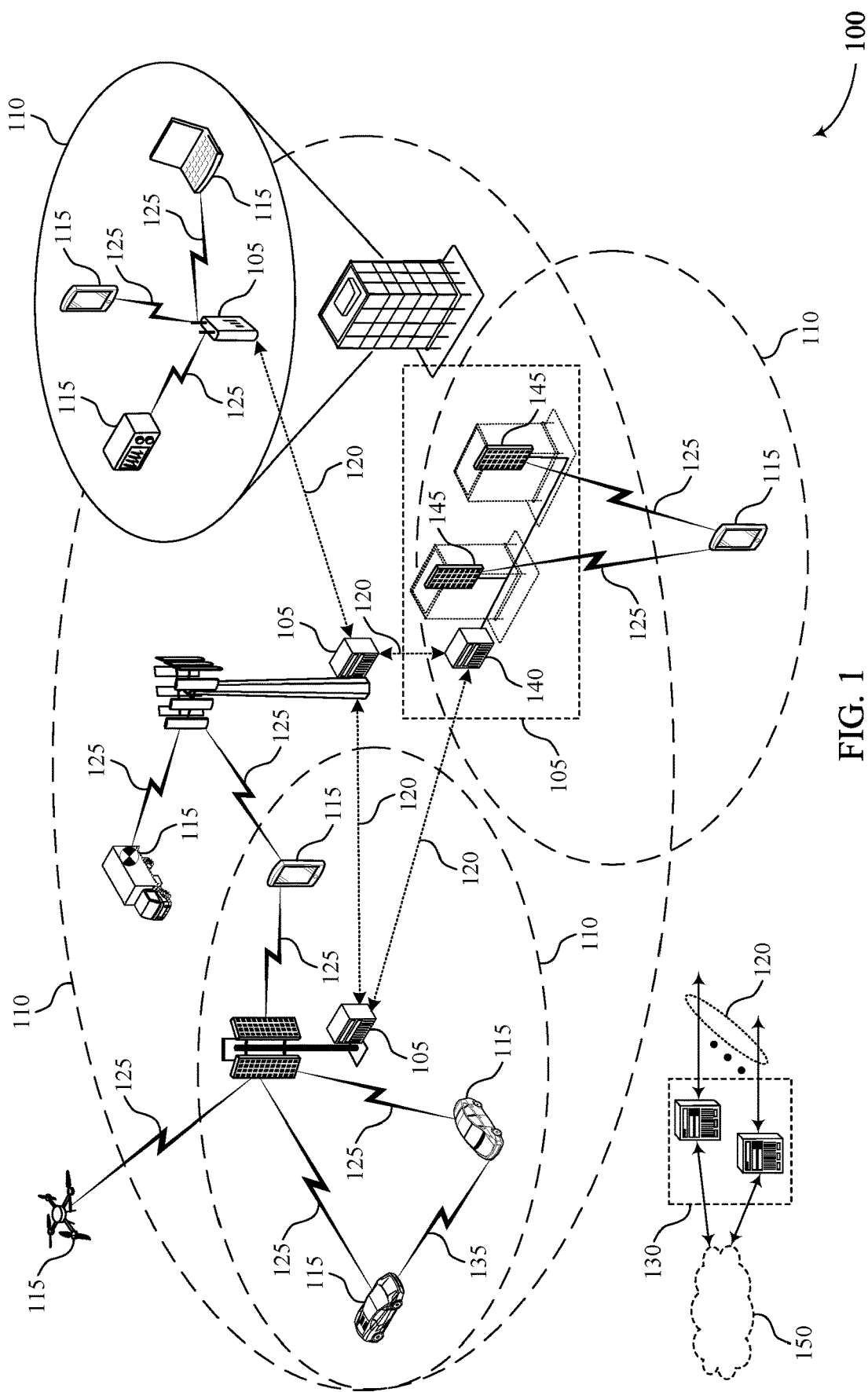
FIGS. 1 and 2 illustrate examples of wireless communications systems that support micro sleep techniques in star topology sidelink communications in accordance with aspects of the present disclosure.

Some wireless communication systems may include one or more user equipments (UEs) and one or more base stations, such as next-generation NodeBs or giga-NodeBs (either of which may be referred to as a gNB) that may support one or more multiple radio access technologies including 4G systems such as Long Term Evolution (LTE) systems, fifth generation (5G) systems which may be referred to as New Radio (NR) systems, and Wi-Fi systems (e.g., wireless local area network (WLAN) systems). According to one or more of these example radio access technologies (RATs), one or more UEs may communicate directly with one another in sidelink communication channels without transmitting through a base station or through a relay point. A sidelink communication may be an example of device-to-device (D2D) communication, vehicle-to-everything (V2X) communication, or another example of sidelink communication in a wireless communications system.

In some cases, a set of UEs may be arranged in a star topology, where one UE may act as a hub UE for a set of peripheral UEs. The peripheral UEs may be unaware of scheduling for sidelink communications from the hub UE. As a result, the peripheral UEs may continuously monitor for transmissions from the hub UE, which may increase power consumption at the peripheral UEs.

According to the techniques described herein, the hub UE may broadcast to peripheral UEs indicating slots when the hub UE will not be in a transmission mode, which may enable the peripheral UEs to enter a power-saving sleep mode in slots when the hub UE is not transmitting. The hub UE may broadcast a slot format indication (SFI) to the peripheral UEs to indicate operating modes in a set of slots. In one aspect, in a first group of slots, the hub UE may operate in a "forward" mode, transmitting sidelink communications to the peripheral UEs. In a second group of slots, the hub UE may operate in a "reverse" mode, receiving sidelink communications from the peripheral UEs. In some aspects, the hub UE may operate in a "not available" mode in a third group of slots, where the hub UE operates in neither a transmission mode nor a reception mode with respect to the peripheral UEs. In slots when the hub UE operates in the "reverse" mode, if a peripheral UE does not have data or control information, the peripheral UE may enter a sleep mode (e.g., conduct a micro sleep) in one or more slots of the second group to save power. In some aspects, the SFI may be arranged as an array indicating the slots and corresponding operating modes. In some aspects, the SFI may be broadcast in a sidelink control information (SCI) message or higher-layer signaling.

Aspects of the disclosure are initially described in the context of wireless communications systems. Aspects of the disclosure are further illustrated by and described with reference to timing diagrams, a process flow, apparatus diagrams, system diagrams, and flowcharts that relate to micro sleep techniques in star topology sidelink communications.

FIG. 1 illustrates an example of a wireless communications system 100 that supports micro sleep techniques in star topology sidelink communications in accordance with aspects of the present disclosure. The wireless communications system 100 may include one or more base stations 105, one or more UEs 115, and a core network 130. In some aspects, the wireless communications system 100 may be a Long Term Evolution (LTE) network, an LTE-Advanced (LTE-A) network, an LTE-A Pro network, or a New Radio (NR) network. In some aspects, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. In one aspect, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some aspects, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. In one aspect, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, in one aspect, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some aspects, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, in one aspect, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. In one aspect, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some aspects, a base station 105 may be movable and therefore provide communication coverage for a moving geographic coverage area 110. In some aspects, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, in one aspect, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some aspects, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some aspects, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. In one aspect, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. In one aspect, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some aspects, a UE 115 may also be able to communicate directly with other UEs 115 over a D2D communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some aspects, groups of the UEs 115 communicating via D2D communications may utilize a one-to-many (1:M) system in which each UE 115 transmits to every other UE 115 in the group. In some aspects, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some aspects, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some aspects, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. In one aspect, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some aspects, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. In one aspect, one or more base station antennas or antenna arrays may be co-located at an antenna assembly, such as an antenna tower. In some aspects, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some aspects, a device may support same-slot HARQ feedback, where the device may provide HARQ feedback in a specific slot for data received in a previous symbol in the slot. In other cases, the device may provide HARQ feedback in a subsequent slot, or according to some other time interval.

According to the techniques described herein, a hub UE 115 in a star topology may broadcast to peripheral UEs 115 indicating slots when the hub UE 115 will not be in a transmission mode, which may enable the peripheral UEs 115 to enter a power-saving sleep mode in slots when the hub UE 115 is not transmitting. The hub UE 115 may broadcast an SFI to the peripheral UEs 115 to indicate operating modes in a set of slots. In one aspect, in a first group of slots, the hub UE 115 may operate in a "forward" mode, transmitting sidelink communications to the peripheral UEs 115. In a second group of slots, the hub UE 115 may operate in a "reverse" mode, receiving sidelink communications from the peripheral UEs 115. In some aspects, the hub UE 115 may operate in a "not available" mode in a third group of slots, where the hub UE 115 operates in neither a transmission mode nor a reception mode with respect to the peripheral UEs 115. In slots when the hub UE 115 operates in the "reverse" mode, if a peripheral UE 115 does not have data or control information, the peripheral UE 115 may enter a sleep mode (e.g., conduct a micro sleep) in one or more slots of the second group to save power. In some aspects, the SFI may be arranged as an array indicating the slots and corresponding operating modes. In some aspects, the SFI may be broadcast in an SCI message or higher-layer signaling.

Figure 2:
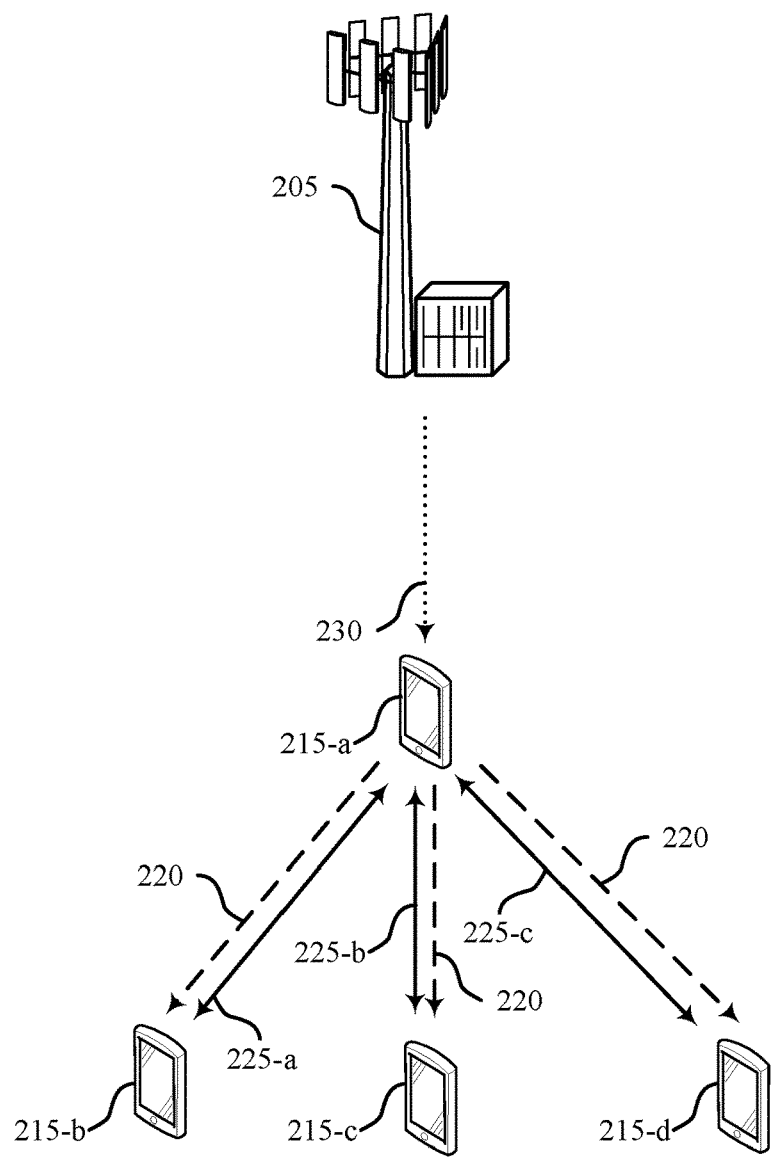

FIG. 2 illustrates an example of a wireless communications system 200 that supports micro sleep techniques in star topology sidelink communications in accordance with aspects of the present disclosure. In some aspects, the wireless communications system 200 may implement aspects of the wireless communications system 100. The wireless communications system 200 may include a base station 205 and UEs 215, which may be aspects of the corresponding devices described with reference to FIG. 1. The wireless communications system 200 may include features for improved sidelink communication operations, among other benefits.

The UEs 215 may transmit and receive communications as scheduled by the base station 205. In some aspects, the UEs 215 may communicate directly with one another in sidelink communications 225 (e.g., over a D2D communication link 135 described with reference to FIG. 1) without transmitting through the base station 205. The sidelink communications 225 may illustrate aspects of D2D communication, V2X communication, or another aspect of communication in the wireless communications system 200. In some aspects, the sidelink communications 225 may include physical sidelink control channel (PSCCH) transmissions, physical sidelink shared channel (PSSCH) transmissions, physical sidelink feedback channel (PSFCH) transmissions, or any combination thereof.

In some cases, the UEs 215 may communicate with one another in a star topology (which may be referred to as a star network), where a UE 215-a may act as a hub coordinating communications with UEs 215-b, 215-c, and 215-d, which may be referred to as peripheral UEs 215. That is, the peripheral UEs 215-*b*, 215-*c*, and 215-*d* may transmit data to the hub UE 215-*a* and receive data from the hub UE 215-*a* in the sidelink communications 225. In some aspects, the roles of hub UE 215 and peripheral UE 215 may be dynamically determined based on temporal traffic flows, rather than fixed. That is, in the aspect illustrated in FIG. 2, the UE 215-*a* may act as the hub UE 215, and in another aspect the UE 215-*b* (or the UE 215-*c*, the UE 215-*d*, etc.) may act as the hub UE 215 for the set of UEs 215.

In some aspects, the star topology may include additional peripheral UEs 215 (not shown). The star topology may provide massive capacity for broad usage of peripheral UEs 215. In some cases, traffic to or from a single peripheral UE 215 (e.g., the UE 215-*b*) may be non-deterministic (e.g., random, or with a non-trivial jitter over a coarse pattern on a sidelink communication 225, such as a sidelink communication 225-*a* between the UEs 215-*a* and 215-*b*).

In some cases, one or more peripheral UEs 215 may operate on battery power, and power efficiency may be an important consideration for communications between the UEs 215 in the star topology. However, the peripheral UEs 215 may be unaware of scheduling for sidelink communications 225 from the hub UE 215-*a*. As a result, the peripheral UEs 215 may continuously monitor for transmissions from the hub UE 215-*a*, which may increase power consumption at the peripheral UEs 215.

According to the techniques described herein, the hub UE 215-*a* may broadcast an SFI 220 to the peripheral UEs 215 to indicate operating modes in a set of slots. In one aspect, in a first group of slots, the hub UE 215-*a* may operate in a "forward" mode, transmitting sidelink communications 225 to the peripheral UEs 215. In a second group of slots, the hub UE 215-*a* may operate in a "reverse" mode, receiving sidelink communications 225 from the peripheral UEs 215. In slots when the hub UE 215-*a* operates in the "reverse" mode, if a peripheral UE 215 (e.g., the UE 215-*b*) does not have data or control information to send to the hub UE 215-*a*, the peripheral UE 215 may enter a sleep mode (e.g., conduct a micro sleep) in one or more slots (or a partial slot) of the second group to save power. In some aspects, the SFI 220 may be arranged as an array indicating the slots and corresponding operating modes.

In some aspects, the SFI 220 may be broadcast in an SCI message. The UE 215-*a* may transmit the SFI 220 in an independent (e.g., dedicated) second stage SCI (SCI-2) message. Additionally or alternatively, the UE 215-*a* may append the SFI 220 to another SCI-2 message when a same modulation and coding scheme (MCS) may be used to save cyclic redundancy check (CRC) bits. In some aspects, the SFI 220 may be carried directly in a first stage (SCI-1) message, such as in a bandwidth without legacy (e.g., LTE) devices. The SCI-1 message may include an identifier for the star topology, as well as an indication of the SFI 220 to enable early detection of the SFI 220. In some aspects, the SFI 220 may be broadcast to the peripheral UEs 215 via higher-layer signaling (e.g., a MAC control element (MAC-CE) or a radio resource control (RRC) message, among other aspects).

In some aspects, the base station 205 may transmit a configured grant 230 scheduling transmission occasions for the UEs 215. The hub UE 215-*a* may use the SFI 220 to temporally void the scheduled transmission occasions for the peripheral UEs 215, or partially void a slot of a transmission occasion that schedules a blind retransmission over a set of slots. In one aspect, the SFI 220 may void a transmission occasion that schedules a transmission from a peripheral UE 215 (e.g., the UE 215-*d*) to the hub UE 215-*a* in a "forward" slot. Similarly, the SFI 220 may void a transmission occasion that schedules a transmission from the hub UE 215-*a* to a peripheral UE 215 (e.g., the UE 215-*c*) in a "reverse" slot. In some aspects, a peripheral UE 215 may enter a sleep mode in a slot with a voided transmission, where the peripheral UE 215 may skip a blind decoding in the slot.

In some aspects, the hub UE 215-*a* may operate in a "not available" mode in a third group of slots, where the hub UE 215-*a* operates in neither a transmission mode nor a reception mode with respect to the peripheral UEs 215. The peripheral UEs 215 may enter a sleep mode in a "not available" slot to save power. In some aspects, the hub UE 215-*a* may use a "not available" slot to communicate with another device (e.g., the base station 205) in the wireless communications system 200, rather than communicating with the peripheral UEs 215. Additionally or alternatively, the hub UE 215-*a* may switch to another channel for communications or radio resource management (RRM) measurement. In some aspects, the hub UE 215-*a* may deactivate one or more transmission components (e.g., a radio or a modem, among other aspects) to save power in a "not available" slot. In some aspects, the SFI 220 may void a transmission occasion scheduled in a "not available" slot by a configured grant 230.

In some aspects, the hub UE 215-*a* may determine separate operation modes for frequency subbands of a channel for the sidelink communications 225. In one aspect, the hub UE 215-*a* may determine to operate in a "not available" mode for one or more subbands based on a limited processing capability at the hub UE 215-*a*, or to save power. Based on the separate operation modes, the hub UE 215-*a* may include a subband-dependent dimension in the SFI 220. In some aspects, the hub UE 215-*a* may duplicate the SFI 220 on multiple sidelink channels to the peripheral UEs 215. That is, the SFI 220 transmitted on a given sidelink channel may include information for all the subband operation modes. Duplicating the SFI 220 may enable the hub UE 215-*a* to schedule sidelink communications 225 for the peripheral UEs 215 with reduced capabilities (e.g., bandwidth capabilities, beamforming capabilities, among other aspects) compared with other UEs 215 in the wireless communications system 200 to improve efficiency and provide other benefits. Additionally or alternatively, duplicating the SFI 220 may enable the peripheral UEs 215 to monitor a portion of a reception resource pool to save power.

Figure 3:
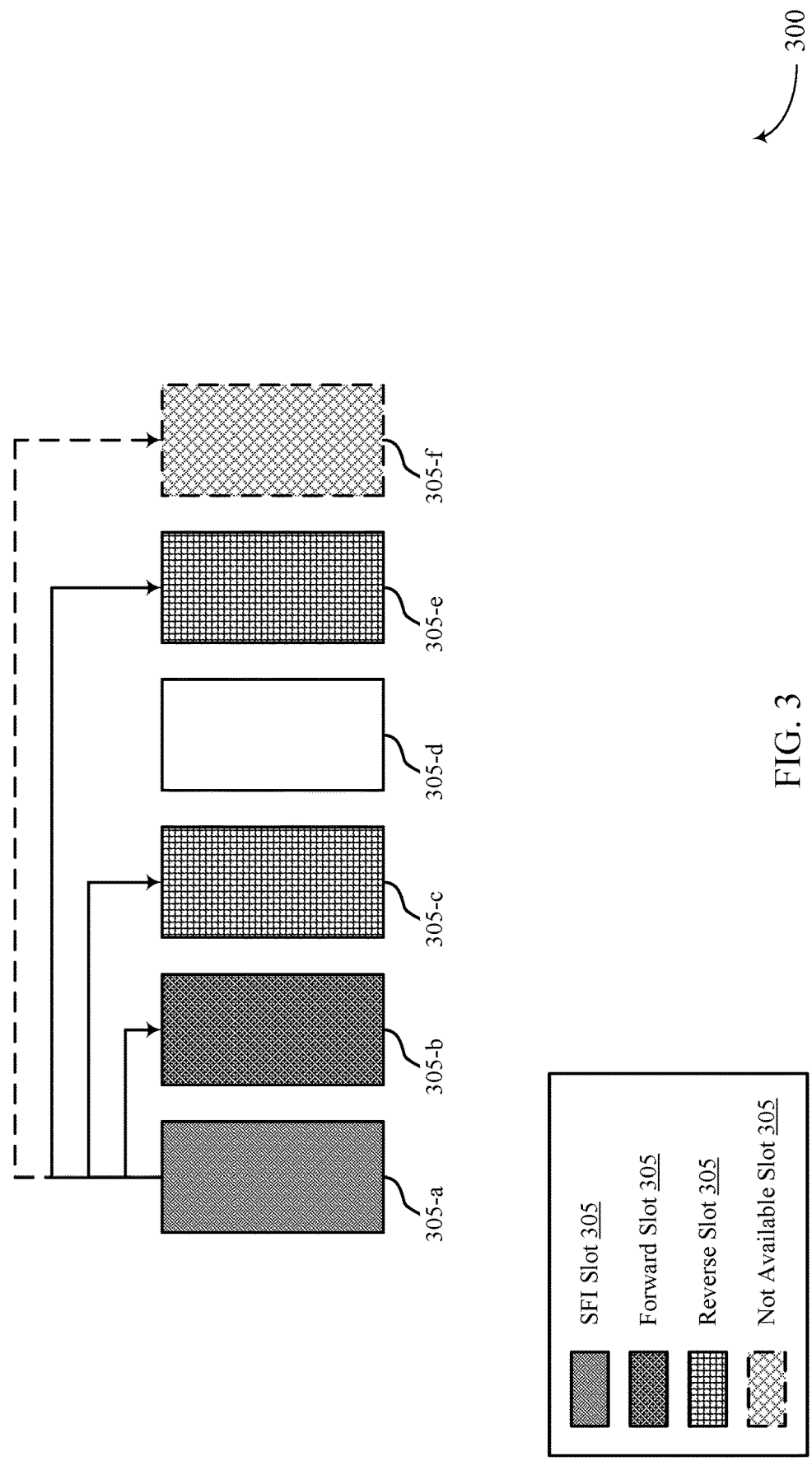
FIGS. 3 and 4 illustrate examples of timing diagrams that support micro sleep techniques in star topology sidelink communications in accordance with aspects of the present disclosure.

FIG. 3 illustrates an example of a timing diagram 300 that supports micro sleep techniques in star topology sidelink communications in accordance with aspects of the present disclosure. In some aspects, the timing diagram 300 may be implemented by or may implement aspects of wireless communications systems 100 and 200. The timing diagram 300 may illustrate operations performed at one or more UEs 115 described with reference to FIG. 1.

A set of UEs may be arranged in a star topology, where one UE may act as a hub UE for a set of peripheral UEs, coordinating sidelink communications (e.g., PSCCH transmissions, PSSCH transmissions, or PSFCH transmissions, among other aspects) in a set of slots 305. That is, the peripheral UEs may transmit data to the hub UE and receive data from the hub UE in the sidelink communications. In some aspects, the roles of the hub UE and the peripheral UEs may be dynamically determined based on temporal traffic flows, rather than fixed.

According to the techniques described herein, the hub UE may broadcast an SFI in a slot 305-*a* to the peripheral UEs to indicate operating modes in the slots 305. In one aspect, in a slot 305-b, the hub UE may operate in a "forward" mode, transmitting sidelink communications to the peripheral UEs. Conversely, in slots 305-c and 305-e, the hub UE may operate in a "reverse" mode, receiving sidelink communications from the peripheral UEs. In some aspects, if a peripheral UE does not have data or control information to transmit to the hub UE, the peripheral UE may enter a sleep mode (e.g., conduct a micro sleep) in the slot 305-c or the slot 305-e (or a portion of the slot 305-c or the slot 305-e) to save power. In some aspects, the SFI in the slot 305-a may be arranged as an array indicating the slots 305 and corresponding operating modes. In some cases, a slot 305 (e.g., a slot 305-d) within the slots 305 may be unassigned or empty.

In some aspects, the hub UE may operate in a "not available" mode in a slot 305-f, where the hub UE operates in neither a transmission mode nor a reception mode with respect to the peripheral UEs. The peripheral UEs may enter a sleep mode in a "not available" slot to save power. In some aspects, the hub UE may use a "not available" slot to communicate with another device (e.g., a base station, or another UE outside the star topology, among other aspects), rather than communicating with the peripheral UEs. Additionally or alternatively, the hub UE may switch to another channel for communications or RRM measurement. In some aspects, the hub UE may deactivate one or more transmission components (e.g., a radio or a modem, among other aspects) to save power in a "not available" slot.

Based on indicating the operation modes, the hub UE may reduce power consumption and improve reliability for the sidelink communications with the peripheral UEs, among other benefits.

Figure 4:
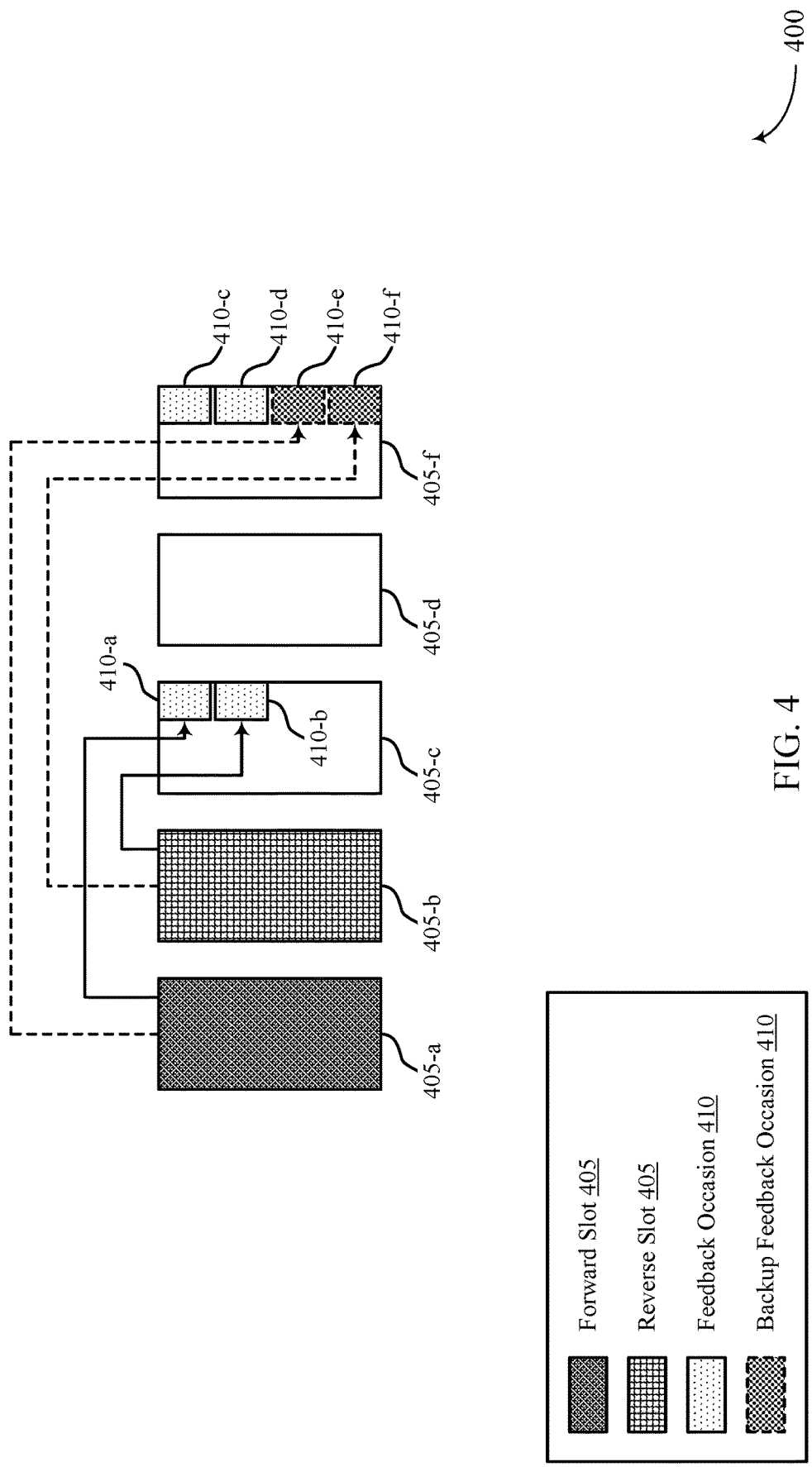

FIG. 4 illustrates an example of a timing diagram 400 that supports micro sleep techniques in star topology sidelink communications in accordance with aspects of the present disclosure. In some aspects, the timing diagram 400 may be implemented by or may implement aspects of wireless communications systems 100 and 200. The timing diagram 400 may illustrate operations performed at one or more UEs 115 as described with reference to FIG. 1.

A set of UEs may be arranged in a star topology, where one UE may act as a hub UE for a set of peripheral UEs; the hub UE may coordinate sidelink communications (e.g., PSCCH transmissions, PSSCH transmissions, or PSFCH transmissions, among other aspects) in a set of slots 405. That is, the peripheral UEs may transmit data to the hub UE and receive data from the hub UE in the sidelink communications. In some aspects, the roles of hub UE and peripheral UE may be dynamically determined based on temporal traffic flows, rather than fixed.

According to the techniques described herein, the hub UE may broadcast an SFI to the peripheral UEs to indicate operating modes in the slots 405. In one aspect, in a slot 405-a, the hub UE may operate in a "forward" mode, transmitting sidelink communications to the peripheral UEs. Conversely, in a slot 405-b, the hub UE may operate in a "reverse" mode, receiving sidelink communications from the peripheral UEs. In some aspects, if a peripheral UE does not have data or control information to transmit to the hub UE, the peripheral UE may enter a sleep mode (e.g., conduct a micro sleep) in the slot 405-b (or a portion of the slot 405-c) to save power. In some aspects, one or more slots 405 (e.g., a slot 405-d) may be empty.

In some aspects, the hub UE may indicate respective operating modes with respect to feedback occasions 410 in slots 405, such as slots 405-c and 405-e. In one aspect, in a slot 405 operating in a "forward" mode, the hub UE may transmit feedback (e.g., HARQ feedback in a PSFCH transmission) to the peripheral UEs but miss feedback transmitted by the peripheral UEs. Similarly, in a slot 405 operating in a "reverse" mode, the hub UE may receive feedback from the peripheral UEs but fail to transmit feedback to the peripheral UEs. In some aspects, the hub UE may determine the operation modes for the slots 405 based on scheduling feedback in feedback occasions 410 of the slots 405. The feedback occasions 410 may be scheduled periodically in slots 405 (e.g., every 2 slots 405). The feedback occasions 410 may be scheduled in resources of the slots 405 according to FDM techniques.

As illustrated in FIG. 4, the peripheral UEs may be scheduled to transmit feedback in a feedback occasion 410-a in a slot 405-c, where the feedback corresponds to forward transmissions in the slot 405-a. Similarly, the hub UE may be scheduled to transmit feedback in a feedback occasion 410-b in the slot 405-c, where the feedback corresponds to reverse transmissions from the peripheral UEs in the slot 405-b.

In some aspects, the slot 405-c may be configured by the hub UE to have a "reverse" or a "not available" operation mode. A peripheral UE waiting for feedback in the feedback occasion 410-b may be configured to interpret the pending feedback as a HARQ negative acknowledgment (NACK) response. That is, if the peripheral UE detects a feedback occasion 410-b in a slot not configured to carry "forward" mode traffic by the SFI, the peripheral UE may interpret the feedback occasion 410-b as a NACK response. Additionally or alternatively, the peripheral UE may attempt to receive the pending feedback at a backup feedback occasion 410-f in a slot 405-f (e.g., in a next feedback occasion falling on a "forward" slot). If the backup feedback occasion 410-f is also configured in a "reverse" or a "not available" operation mode, the feedback occasion 410-f may be interpreted as carrying a NACK response.

In some aspects, the slot 405-c may be configured by the hub UE to have a "forward" or a "not available" operation mode. A peripheral UE configured to transmit feedback in the feedback occasion 410-a may assume the hub UE receives a HARQ NACK response in the feedback occasion 410-a. Additionally or alternatively, the peripheral UE may attempt to transmit the pending feedback at a backup feedback occasion 410-e in the slot 405-f. If the backup feedback occasion 410-e is also configured in a "forward" or a "not available" operation mode, the peripheral UE may assume the hub UE receives a HARQ NACK response in the feedback occasion 410-e.

Based on indicating the operation modes and the feedback occasions 410 for the slots 405, the hub UE may reduce power consumption and improve reliability for the sidelink communications with the peripheral UEs, among other benefits.

Figure 5:
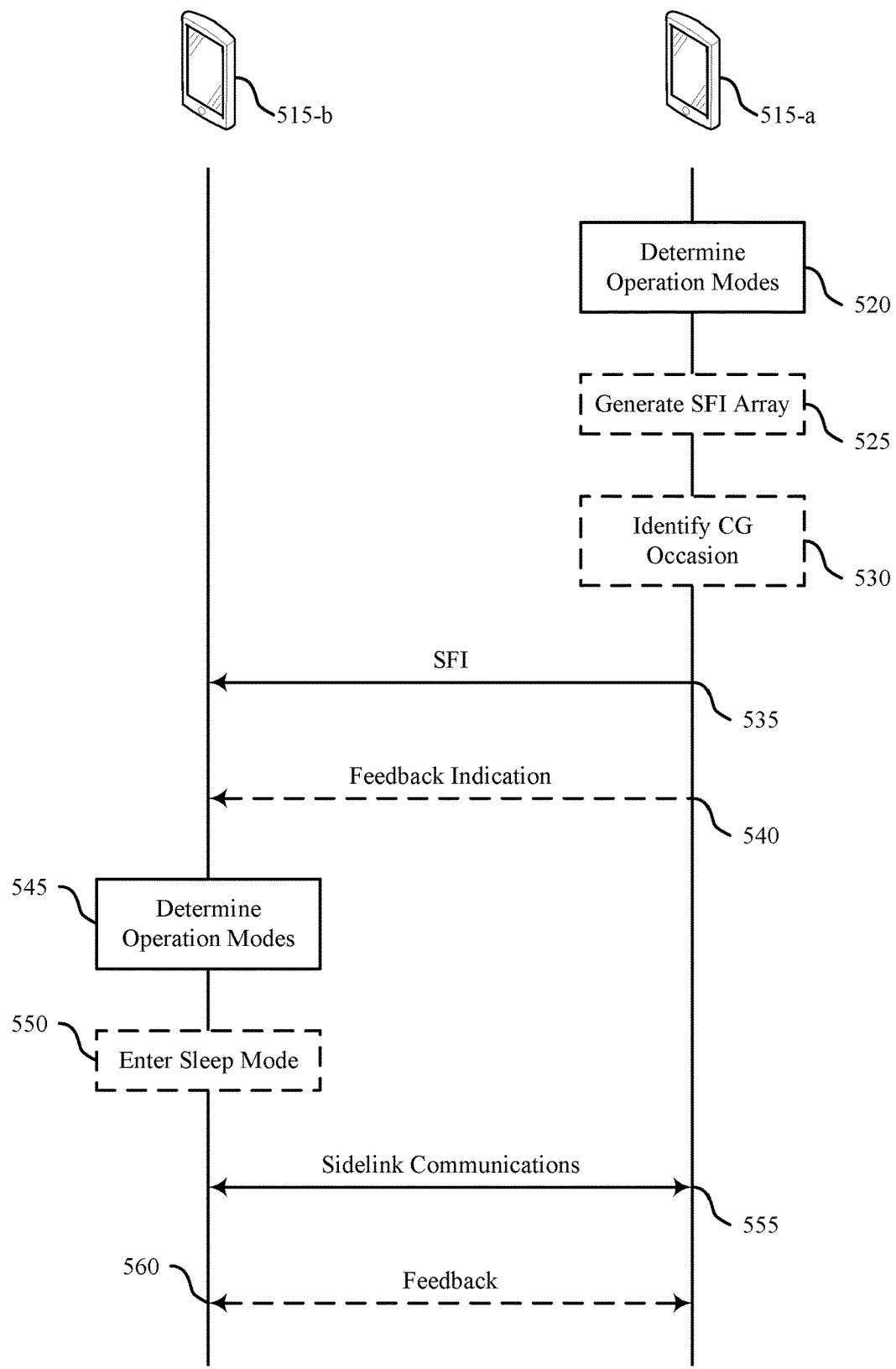
FIG. 5 illustrates an example of a process flow that supports micro sleep techniques in star topology sidelink communications in accordance with aspects of the present disclosure.

FIG. 5 illustrates an example of a process flow 500 that supports micro sleep techniques in star topology sidelink communications in accordance with aspects of the present disclosure. In some aspects, the process flow 500 may be implemented by or may implement aspects of wireless communications systems 100 and 200. In one aspect, the process flow 500 may include operations associated with a set of UEs 515, which may be aspects of the corresponding devices described with reference to FIGS. 1 and 2. In the following description of the process flow 500, the operations between the UEs 515 may be performed in a different order than the order shown, or the operations performed by the UEs 515 may be performed in different orders or at different times. Some operations may also be omitted from the process flow 500, and other operations may be added to the process flow 500. The operations performed by the UEs 515 may promote improvements to efficiency and reliability for sidelink communications between the UEs 515, among other benefits.

The UEs 515 may communicate with one another in a star topology (which may be referred to as a star network), where a UE 515-a may act as a hub UE 515-a coordinating sidelink communications with a UE 515-b, which may be referred to as a peripheral UE 515-b. That is, the peripheral UE 515-b may transmit data to the hub UE 515-a and receive data from the hub UE 515-a in sidelink communications as coordinated by the hub UE 515-a. In some aspects, the roles of a hub UE 515 and a peripheral UE 515 may be dynamically determined based on temporal traffic flows, rather than fixed. That is, in the aspect illustrated in FIG. 5, the UE 515-a may act as the hub UE 515, and in another aspect the UE 515-b may act as the hub UE 515 for the set of UEs 515. In some aspects, the star topology may include additional peripheral UEs 515 (not shown).

At 520, the hub UE 515-a may determine respective operation modes for a set of slots for sidelink communications with the peripheral UE 515-b. In one aspect, in a first group of slots, the hub UE 515-a may operate in a "forward" mode for transmitting sidelink communications to the peripheral UE 515-b. In a second group of slots, the hub UE 515-a may operate in a "reverse" mode for receiving sidelink communications from the peripheral UE 515-b. In some aspects, the hub UE 515-a may operate in a "not available" mode in a third group of slots, where the hub UE 515-a operates in neither a transmission mode nor a reception mode with respect to the peripheral UE 515-b.

In some aspects, at 525 the hub UE 515-a may generate an array indicating the slots and corresponding operating modes. The array may include a respective element for a subset or all slots of the set of slots. In one aspect, the array may have entries for the set of slots having a corresponding operating mode. Each entry may specify a slot or slot range and an operating mode. Thus, the array may be a list of slot numbers (e.g., specified by a quantity of slots from a reference slot such as the current slot) and corresponding modes.

In some aspects, at 530 the hub UE 515-a may identify a configured grant (CG) scheduling transmission occasions for the UEs 515. Based on determining the operation modes, the hub UE 515-a may temporally void the scheduled transmission occasions for the peripheral UE 515-b, or partially void a slot of a transmission occasion that schedules a blind retransmission over a set of slots. In one aspect, the hub UE 515-a may void a transmission occasion that schedules a transmission from the peripheral UE 515-b to the hub UE 515-a by configuring the corresponding slot to a "forward" mode. Similarly, the hub UE 515-a may void a transmission occasion that schedules a transmission from the hub UE 515-a to the peripheral UE 515-b by configuring the corresponding slot to a "reverse" mode.

At 535, the hub UE 515-a may transmit an SFI to the peripheral UE 515-b. In some aspects, the SFI may include the generated array. In some aspects, the hub UE 515-a may broadcast the SFI in an SCI message. The hub UE 515-a may transmit the SFI in an independent (e.g., dedicated) SCI-2 message. Additionally or alternatively, the hub UE 515-a may append the SFI to another SCI-2 message where a same MCS may be used (e.g., when an MCS used for the SCI-2 message is compatible with broadcast for the SFI) to save CRC bits. In some aspects, the SFI may be carried directly in an SCI-1 message, such as in a bandwidth without legacy (e.g., LTE) devices. In one aspect, the SFI may be carried in a new format for the SCI-1 message. The SCI-1 message may include an identifier for the star topology, as well as an indication of the SFI to enable early detection of the SFI. In some aspects, the SFI may be broadcast to the peripheral UE 515-b via higher-layer signaling (e.g., a MAC-CE or an RRC message, among other aspects). In some aspects, the hub UE 515-a may include a subband-dependent dimension in the SFI or duplicate the SFI on multiple sidelink channels.

In some aspects, at 540 the hub UE 515-a may transmit a feedback indication to the peripheral UE 515-b. The feedback indication may schedule resources for feedback occasions corresponding to the set of slots. In some aspects, the feedback occasions may be scheduled in resources of slots according to FDM techniques.

At 545, the peripheral UE 515-b may determine the operation modes based on the SFI. In some aspects, at 550 the peripheral UE 515-b may enter a sleep mode (e.g., conduct a micro sleep) in one or more slots to save power. In one aspect, the peripheral UE 515-b may enter a sleep mode in a slot (or a portion of a slot) when the hub UE 515-a operates in a "not available" mode, or in a slot when the hub UE 515-a operates in the "reverse" mode and the peripheral UE 515-b does not have data or control information to transmit to the hub UE 515-a.

At 555, the UEs 515 may communicate the sidelink communications in the set of slots according to the indicated operation modes. In some aspects, the sidelink communications may include PSCCH transmissions, PSSCH transmissions, or any combination thereof. In some aspects, at 560 the UEs 515 may communicate feedback in feedback occasions as scheduled by the hub UE 515-a. Based on indicating the operation modes and the feedback occasions for the slots, the hub UE 515-a may reduce power consumption and improve reliability for the sidelink communications with the peripheral UE 515-b, among other benefits.

Figure 6:
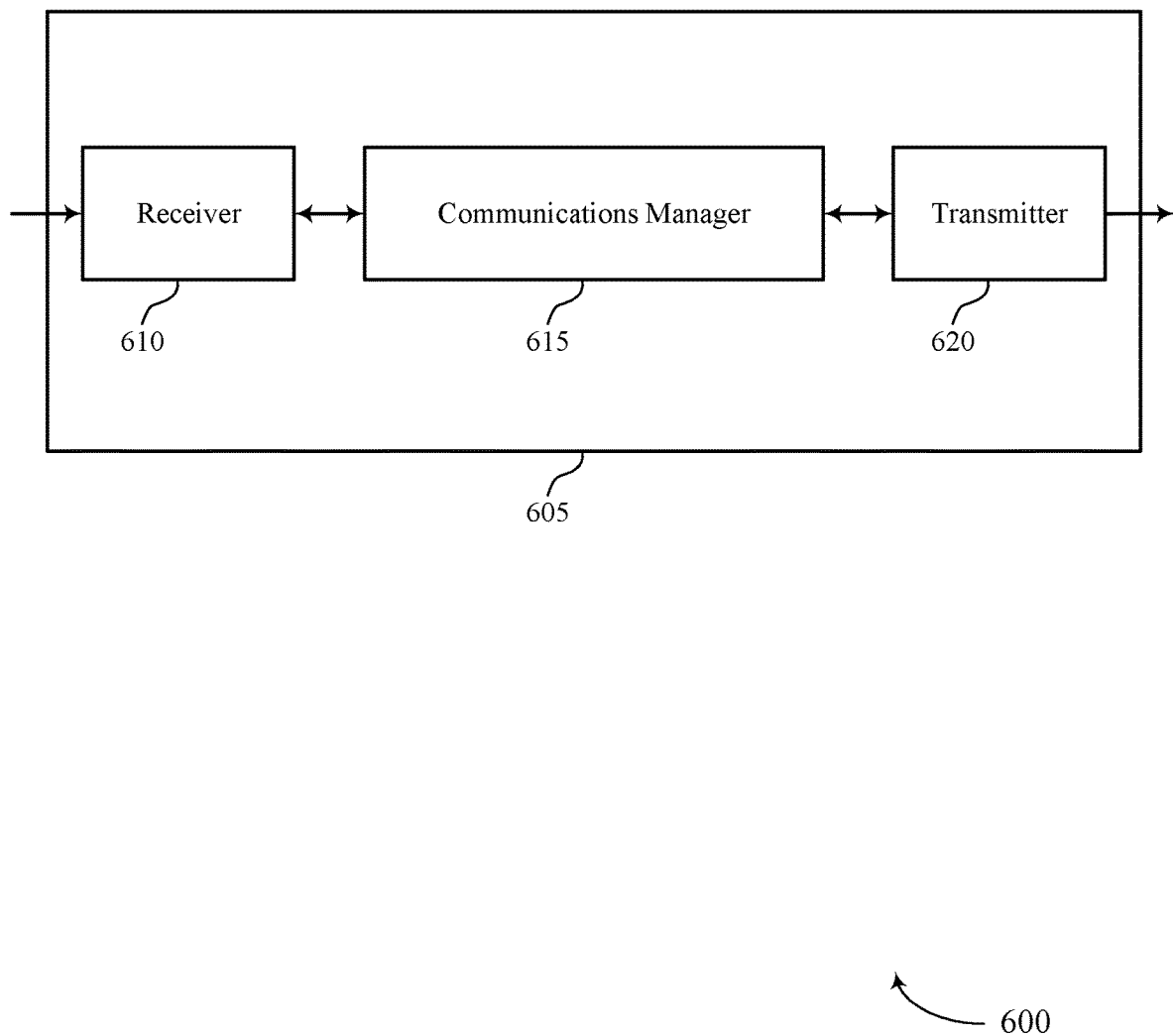
FIGS. 6 and 7 show block diagrams of devices that support micro sleep techniques in star topology sidelink communications in accordance with aspects of the present disclosure.

FIG. 6 shows a block diagram 600 of a device 605 that supports micro sleep techniques in star topology sidelink communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to micro sleep techniques in star topology sidelink communications, etc.). Information may be passed on to other components of the device 605. The receiver 610 may be an example of aspects of the transceiver 920 described with reference to FIG. 9. The receiver 610 may utilize a single antenna or a set of antennas.

In some aspects, the communications manager 615 may determine, for a set of slots, respective operation modes for sidelink communications, each operation mode selected from a set of operation modes, transmit, to a set of second UEs, a slot format indication for the set of slots that indicates the respective operation modes, and communicate with one or more second UEs of the set of second UEs in one or more slots of the set of slots based on the transmitting the slot format indication.

In some aspects, the communications manager 615 may receive, from a first UE, a slot format indication that indicates respective operation modes for sidelink communications in a set of slots, each operation mode selected from a set of operation modes, determine a first operation mode corresponding to a first subset of the set of slots and a second operation mode corresponding to a second subset of the set of slots based on the receiving the slot format indication, and communicate with the first UE in one or more slots of the set of slots based on the determining the first operation mode and the second operation mode.

The communications manager 615 as described herein may be implemented to realize one or more potential advantages. One implementation may allow the device 605 to save power by communicating with UEs 115 (as shown in FIG. 1) in sidelink communications more efficiently. For example, the device 605 may improve reliability in communications with UEs 115, as the device 605 may be able to determine, based on determining the operation modes, whether a sidelink transmission is likely to be successful. Using the techniques described herein, the device 605 may more accurately identify slots for sleep modes, which may improve power efficiency at the device 605. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some aspects, the communications manager 615, or its sub-components, may be a separate and distinct component in accordance with various aspects of the present disclosure. In some aspects, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some aspects, the transmitter 620 may be collocated with a receiver 610 in a transceiver module. In one aspect, the transmitter 620 may be an example of aspects of the transceiver 920 described with reference to FIG. 9. The transmitter 620 may utilize a single antenna or a set of antennas.

Figure 7:
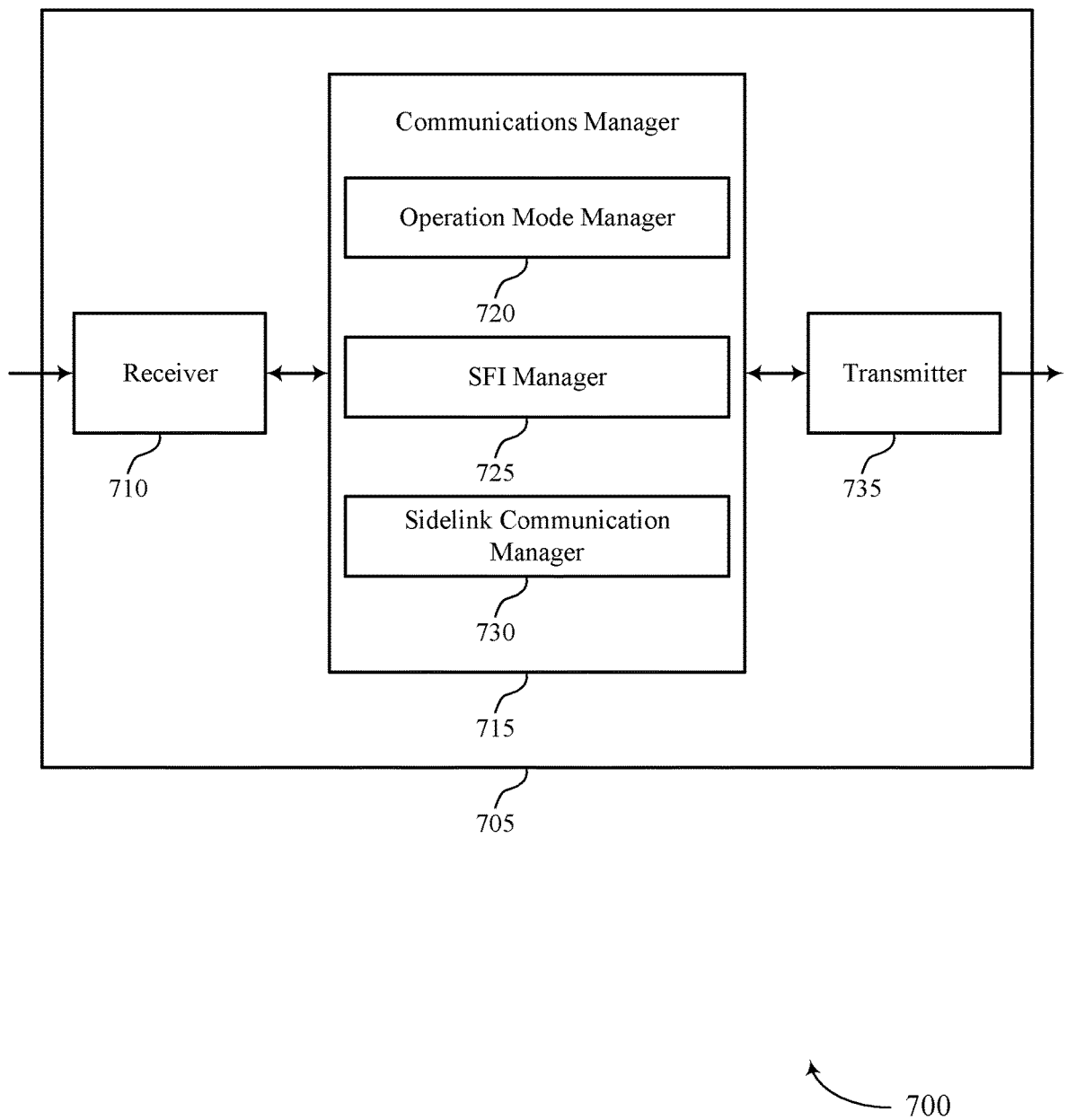

FIG. 7 shows a block diagram 700 of a device 705 that supports micro sleep techniques in star topology sidelink communications in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to micro sleep techniques in star topology sidelink communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an operation mode manager 720, an SFI manager 725, and a sidelink communication manager 730. The communications manager 715 may be an example of aspects of the communications manager 910 described herein.

In some aspects, the operation mode manager 720 may determine, for a set of slots, respective operation modes for sidelink communications, each operation mode selected from a set of operation modes. The SFI manager 725 may transmit, to a set of second UEs, a slot format indication for the set of slots that indicates the respective operation modes. The sidelink communication manager 730 may communicate with one or more second UEs of the set of second UEs in one or more slots of the set of slots based on the transmitting the slot format indication.

In some aspects, the SFI manager 725 may receive, from a first UE, a slot format indication that indicates respective operation modes for sidelink communications in a set of slots, each operation mode selected from a set of operation modes. The operation mode manager 720 may determine a first operation mode corresponding to a first subset of the set of slots and a second operation mode corresponding to a second subset of the set of slots based on the receiving the slot format indication. The sidelink communication manager 730 may communicate with the first UE in one or more slots of the set of slots based on the determining the first operation mode and the second operation mode.

The transmitter 735 may transmit signals generated by other components of the device 705. In some aspects, the transmitter 735 may be collocated with a receiver 710 in a transceiver module. In one aspect, the transmitter 735 may be an example of aspects of the transceiver 920 described with reference to FIG. 9. The transmitter 735 may utilize a single antenna or a set of antennas.

Figure 8:
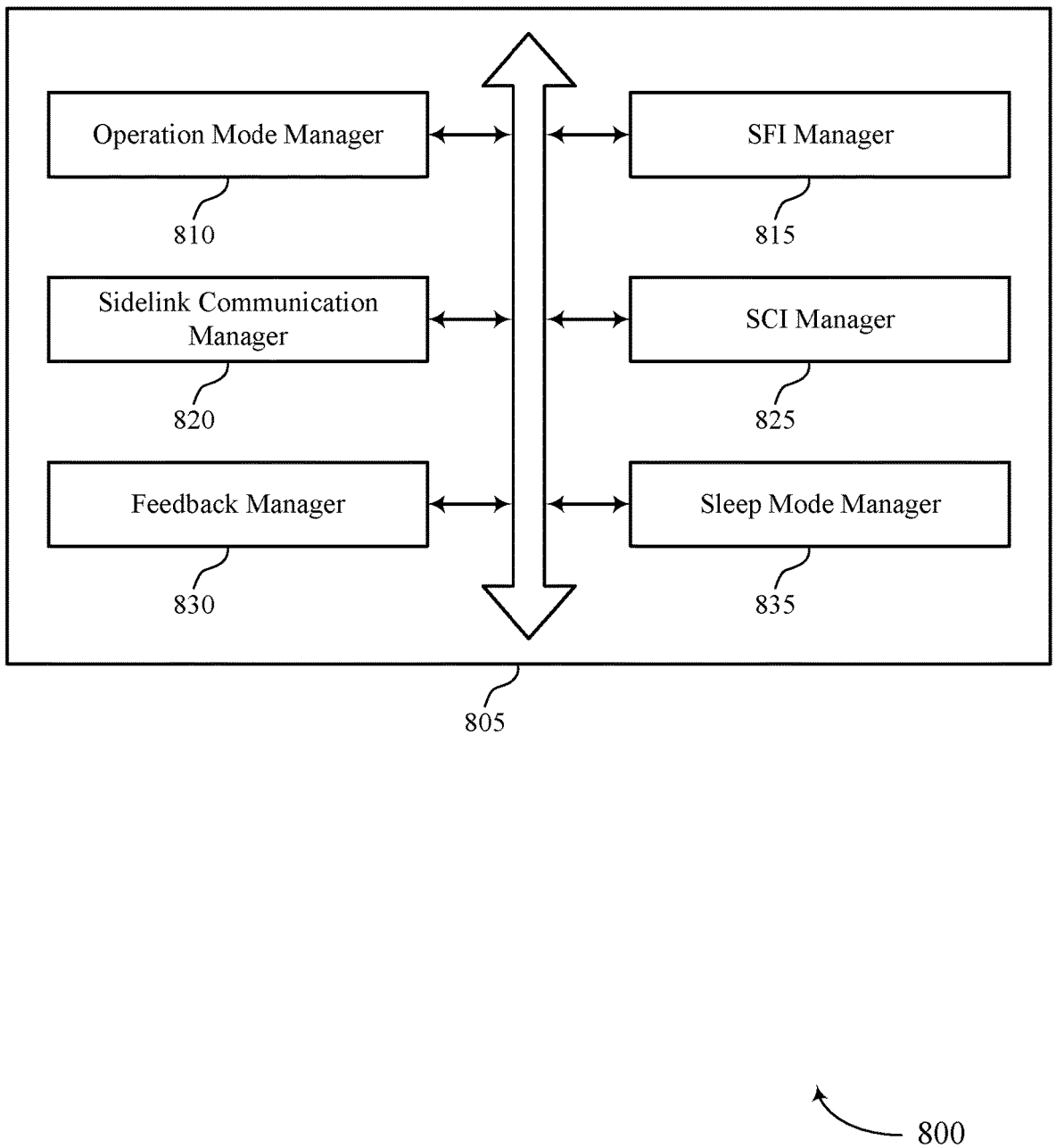
FIG. 8 shows a block diagram of a communications manager that supports micro sleep techniques in star topology sidelink communications in accordance with aspects of the present disclosure.

FIG. 8 shows a block diagram 800 of a communications manager 805 that supports micro sleep techniques in star topology sidelink communications in accordance with aspects of the present disclosure. The communications manager 805 may be an example of aspects of a communications manager 615, a communications manager 715, or a communications manager 910 described herein. The communications manager 805 may include an operation mode manager 810, an SFI manager 815, a sidelink communication manager 820, a SCI manager 825, a feedback manager 830, and a sleep mode manager 835. Each of these modules may communicate, directly or indirectly, with one another (e.g., via one or more buses).

In some aspects, the operation mode manager 810 may determine, for a set of slots, respective operation modes for sidelink communications, each operation mode selected from a set of operation modes. In some aspects, the operation mode manager 810 may identify a first operation mode corresponding to a first subset of the set of slots and a second operation mode corresponding to a second subset of the set of slots based on the determining the respective operation modes for the set of slots. In some aspects, the operation mode manager 810 may identify a third operation mode corresponding to a third subset of the set of slots based on the determining the respective operation modes for the set of slots.

In some aspects, the operation mode manager 810 may identify the respective operation mode for each slot of the fourth subset based on the determining the respective operation modes for the set of slots. In some aspects, the operation mode manager 810 may determine respective operation modes for a set of subbands in each slot of the set of slots, where the slot format indication for the set of slots indicates the respective operation modes for the set of subbands.

In some aspects, the SFI manager 815 may transmit, to a set of second UEs, a slot format indication for the set of slots that indicates the respective operation modes. In some aspects, the SFI manager 815 may generate an array indicating the set of slots and the respective operation modes, where the slot format indication includes the array. In some aspects, the SFI manager 815 may transmit the slot format indication in each sub-channel of a set of sub-channels. In some aspects, the SFI manager 815 may transmit the slot format indication in a MAC-CE, an RRC message, or any combination thereof.

In some aspects, the sidelink communication manager 820 may communicate with one or more second UEs of the set of second UEs in one or more slots of the set of slots based on the transmitting the slot format indication. In some aspects, the sidelink communication manager 820 may transmit a first sidelink transmission to a second UE of the set of second UEs in one or more slots of the first subset based on the identifying the first operation mode. In some aspects, the sidelink communication manager 820 may receive a second sidelink transmission from the second UE of the set of second UEs in one or more slots of the second subset based on the identifying the second operation mode.

In some aspects, the sidelink communication manager 820 may identify a configured grant occasion associated with a slot of the set of slots, where the configured grant occasion schedules a sidelink communication with a second UE of the set of second UEs in the slot. In some aspects, the sidelink communication manager 820 may determine a mismatch between the scheduled sidelink communication and the respective operation mode for the slot. In some aspects, the sidelink communication manager 820 may refrain from communicating the sidelink communication with the second UE in the slot based on the determining the mismatch.

In some aspects, the sidelink communication manager 820 may refrain from communicating with the set of second UEs in one or more slots of the third subset based on the identifying the third operation mode. In some aspects, the sidelink communication manager 820 may deactivate one or more transmission components at the first UE in the one or more slots of the third subset based on the identifying the third operation mode, where the refraining from communicating with the set of second UEs in the one or more slots of the third subset is further based on the deactivating the one or more transmission components.

In some aspects, the SCI manager 825 may transmit the slot format indication in a sidelink control information message. In some aspects, the SCI manager 825 may identify control information in the sidelink control information message. In some aspects, the SCI manager 825 may append the slot format indication to the control information in the sidelink control information message based on determining that a modulation and coding scheme for the sidelink control information message is compatible with transmitting the slot format indication.

In some aspects, the feedback manager 830 may transmit, to the set of second UEs, a feedback indication that indicates a fourth subset of the set of slots for feedback associated with the sidelink communications. In some aspects, the feedback manager 830 may communicate the feedback with one or more second UEs of the set of second UEs in one or more slots of the fourth subset based on the transmitting the feedback indication and the identifying the respective operation modes.

In some aspects, the operation mode manager 810 may determine a first operation mode corresponding to a first subset of the set of slots and a second operation mode corresponding to a second subset of the set of slots based on the receiving the slot format indication. In some aspects, the operation mode manager 810 may determine a third operation mode corresponding to a third subset of the set of slots based on the receiving the slot format indication. In some aspects, the operation mode manager 810 may identify the respective operation mode for each slot of the fourth subset based on the receiving the slot format indication.

In some aspects, the SFI manager 815 may receive, from a first UE, a slot format indication that indicates respective operation modes for sidelink communications in a set of slots, each operation mode selected from a set of operation modes. In some aspects, the SFI manager 815 may identify an array indicating the set of slots and the respective operation modes, where the slot format indication includes the array. In some aspects, the SFI manager 815 may receive the slot format indication in one or more sub-channels of a set of sub-channels. In some aspects, the SFI manager 815 may receive the slot format indication in a MAC-CE, an RRC message, or any combination thereof. In some cases, the slot format indication indicates respective operation modes for a set of subbands in each slot of the set of slots.

In some aspects, the sidelink communication manager 820 may communicate with the first UE in one or more slots of the set of slots based on the determining the first operation mode and the second operation mode. In some aspects, the sidelink communication manager 820 may receive, from the first UE, a first sidelink transmission in one or more slots of the first subset based on the determining the first operation mode. In some aspects, the sidelink communication manager 820 may transmit, to the first UE, a second sidelink transmission in one or more slots of the second subset based on the determining the second operation mode. In some aspects, the sidelink communication manager 820 may refrain from communicating with the first UE in at least the portion of the slot of the second subset based on the entering the sleep mode.

In some aspects, the sidelink communication manager 820 may identify a configured grant occasion associated with a slot of the set of slots, where the configured grant occasion schedules a sidelink communication with the first UE in the slot. In some aspects, the sidelink communication manager 820 may determine a mismatch between the scheduled sidelink communication and the respective operation mode for the slot. In some aspects, the sidelink communication manager 820 may refrain from communicating the sidelink communication with the first UE in the slot based on the determining the mismatch. In some aspects, the sidelink communication manager 820 may refrain from decoding the sidelink communication with the first UE in the slot based on the determining the mismatch.

In some aspects, the sidelink communication manager 820 may refrain from communicating with the first UE in at least the portion of the slot of the third subset based on the entering the sleep mode.

In some aspects, the SCI manager 825 may receive the slot format indication in a sidelink control information message. In some cases, the sidelink control information message includes an indication of the slot format indication and a network identifier associated with the first UE and the set of second UEs. In some cases, the sidelink control information message includes an indication of the slot format indication and a network identifier associated with the first UE and the second UE.

In some aspects, the feedback manager 830 may receive, from the first UE, a feedback indication that indicates a fourth subset of the set of slots for feedback associated with the sidelink communications. In some aspects, the feedback manager 830 may communicate the feedback with the first UE in one or more slots of the fourth subset based on the receiving the feedback indication and the identifying the respective operation modes. In some aspects, the feedback manager 830 may refrain from communicating the feedback with the first UE in a first slot of the fourth subset based on the identifying the respective operation mode for the first slot. In some aspects, the feedback manager 830 may communicate the feedback with the first UE in a second slot of the fourth subset based on the identifying the respective operation mode for the second slot.

In some aspects, the sleep mode manager 835 may enter a sleep mode in at least a portion of a slot of the second subset based on the determining the second operation mode. In some aspects, the sleep mode manager 835 may enter a sleep mode in the slot based on the determining the mismatch, where the refraining from communicating with the first UE in the slot is further based on the entering the sleep mode. In some aspects, the sleep mode manager 835 may enter a sleep mode in at least a portion of a slot of the third subset based on the determining the third operation mode.

Figure 9:
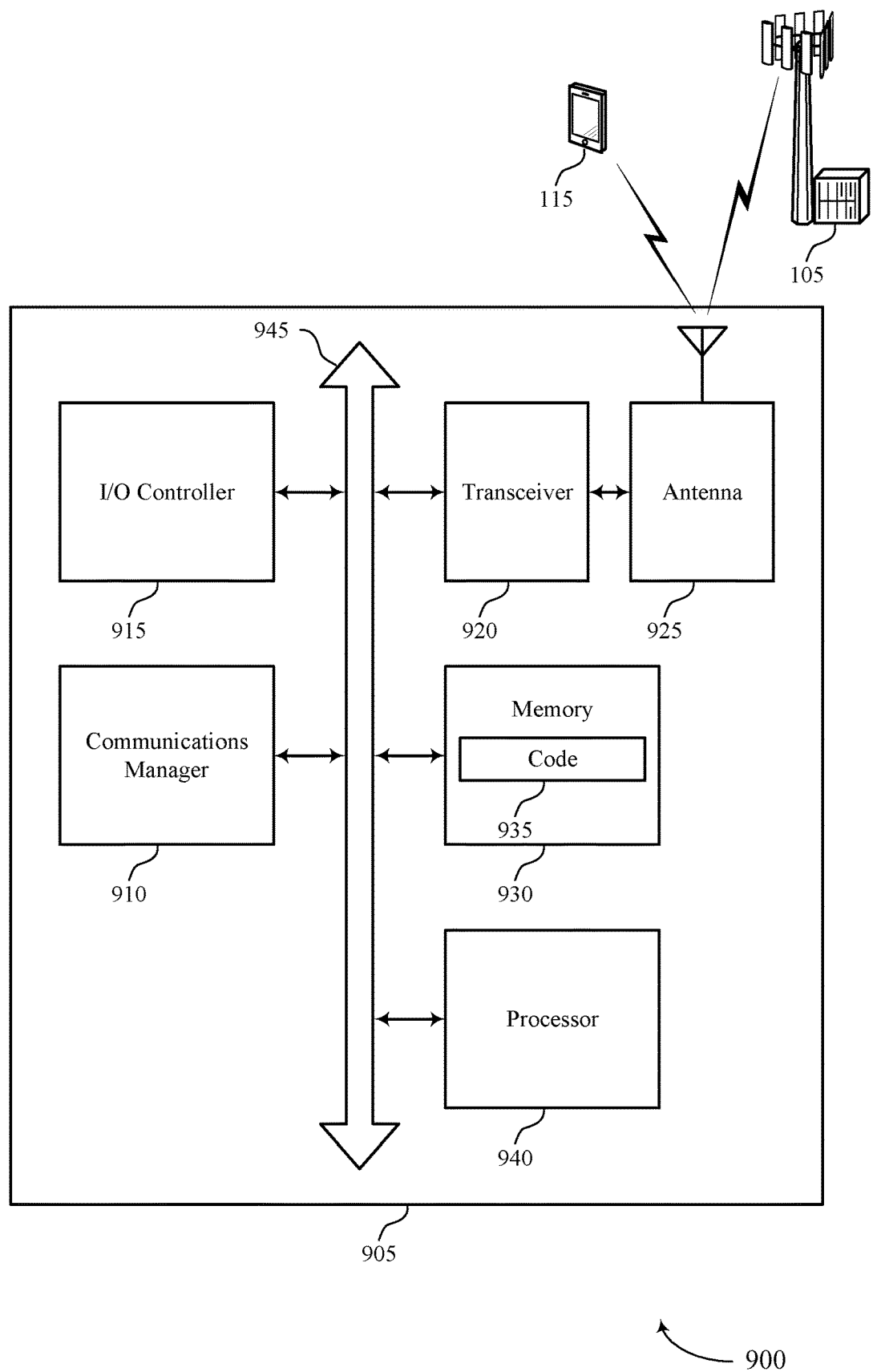
FIG. 9 shows a diagram of a system including a device that supports micro sleep techniques in star topology sidelink communications in accordance with aspects of the present disclosure.

FIG. 9 shows a diagram of a system 900 including a device 905 that supports micro sleep techniques in star topology sidelink communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

In some aspects, the communications manager 910 may determine, for a set of slots, respective operation modes for sidelink communications, each operation mode selected from a set of operation modes, transmit, to a set of second UEs, a slot format indication for the set of slots that indicates the respective operation modes, and communicate with one or more second UEs of the set of second UEs in one or more slots of the set of slots based on the transmitting the slot format indication.

In some aspects, the communications manager 910 may receive, from a first UE, a slot format indication that indicates respective operation modes for sidelink communications in a set of slots, each operation mode selected from a set of operation modes, determine a first operation mode corresponding to a first subset of the set of slots and a second operation mode corresponding to a second subset of the set of slots based on the receiving the slot format indication, and communicate with the first UE in one or more slots of the set of slots based on the determining the first operation mode and the second operation mode.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. In one aspect, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting micro sleep techniques in star topology sidelink communications).

The processor 940 of the device 905 (e.g., controlling the receiver 610, the transmitter 620, or the transceiver 920) may reduce power consumption and increase sidelink transmission reliability according to the techniques described herein. In some aspects, the processor 940 of the device 905 may adjust sidelink communications based on determining the operation modes. For example, the processor 940 of the device 905 may turn on one or more processing units for identifying operation modes, increase a processing clock, or a similar mechanism within the device 905. As such, when subsequent sidelink communications are scheduled, the processor 940 may more accurately identify slots for sleep modes. Improvements in scheduling may result in improvements in power saving and sidelink communications reliability, which may further increase power efficiency at the device 905 (e.g., by eliminating unnecessary repeated sidelink communications, identifying slots for sleep modes, etc.).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
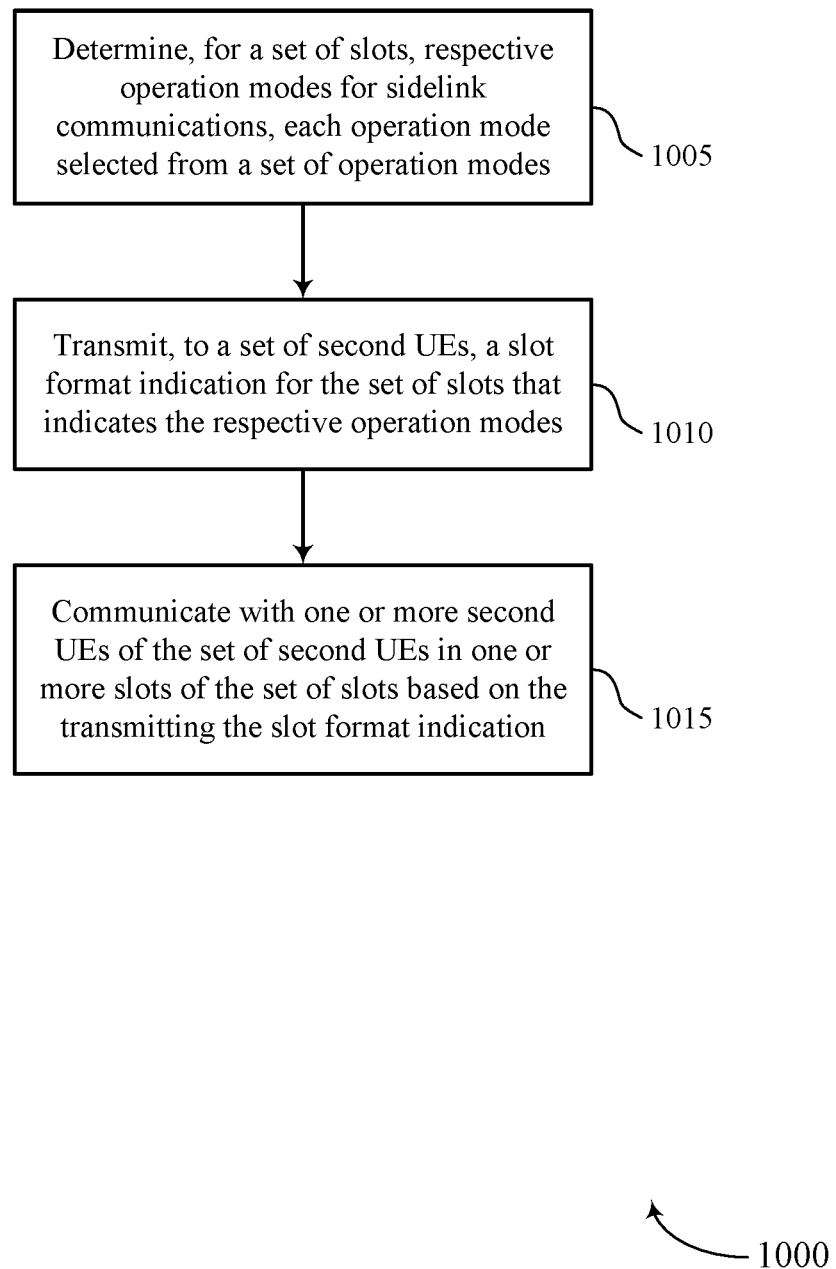
FIGS. 10 through 13 show flowcharts illustrating methods that support micro sleep techniques in star topology sidelink communications in accordance with aspects of the present disclosure.

FIG. 10 shows a flowchart illustrating a method 1000 that supports micro sleep techniques in star topology sidelink communications in accordance with aspects of the present disclosure. The operations of method 1000 may be implemented by a UE 115 or its components as described herein. In one aspect, the operations of method 1000 may be performed by a communications manager as described with reference to FIGS. 6 through 9. In some aspects, a first UE may execute a set of instructions to control the functional elements of the first UE to perform the functions described below. Additionally or alternatively, a first UE may perform aspects of the functions described below using special-purpose hardware.

At 1005, the first UE may determine, for a set of slots, respective operation modes for sidelink communications, each operation mode selected from a set of operation modes. The operations of 1005 may be performed according to the methods described herein. In some aspects, aspects of the operations of 1005 may be performed by an operation mode manager as described with reference to FIGS. 6 through 9.

At 1010, the first UE may transmit, to a set of second UEs, a slot format indication for the set of slots that indicates the respective operation modes. The operations of 1010 may be performed according to the methods described herein. In some aspects, aspects of the operations of 1010 may be performed by an SFI manager as described with reference to FIGS. 6 through 9.

At 1015, the first UE may communicate with one or more second UEs of the set of second UEs in one or more slots of the set of slots based on the transmitting the slot format indication. The operations of 1015 may be performed according to the methods described herein. In some aspects, aspects of the operations of 1015 may be performed by a sidelink communication manager as described with reference to FIGS. 6 through 9.

Figure 11:
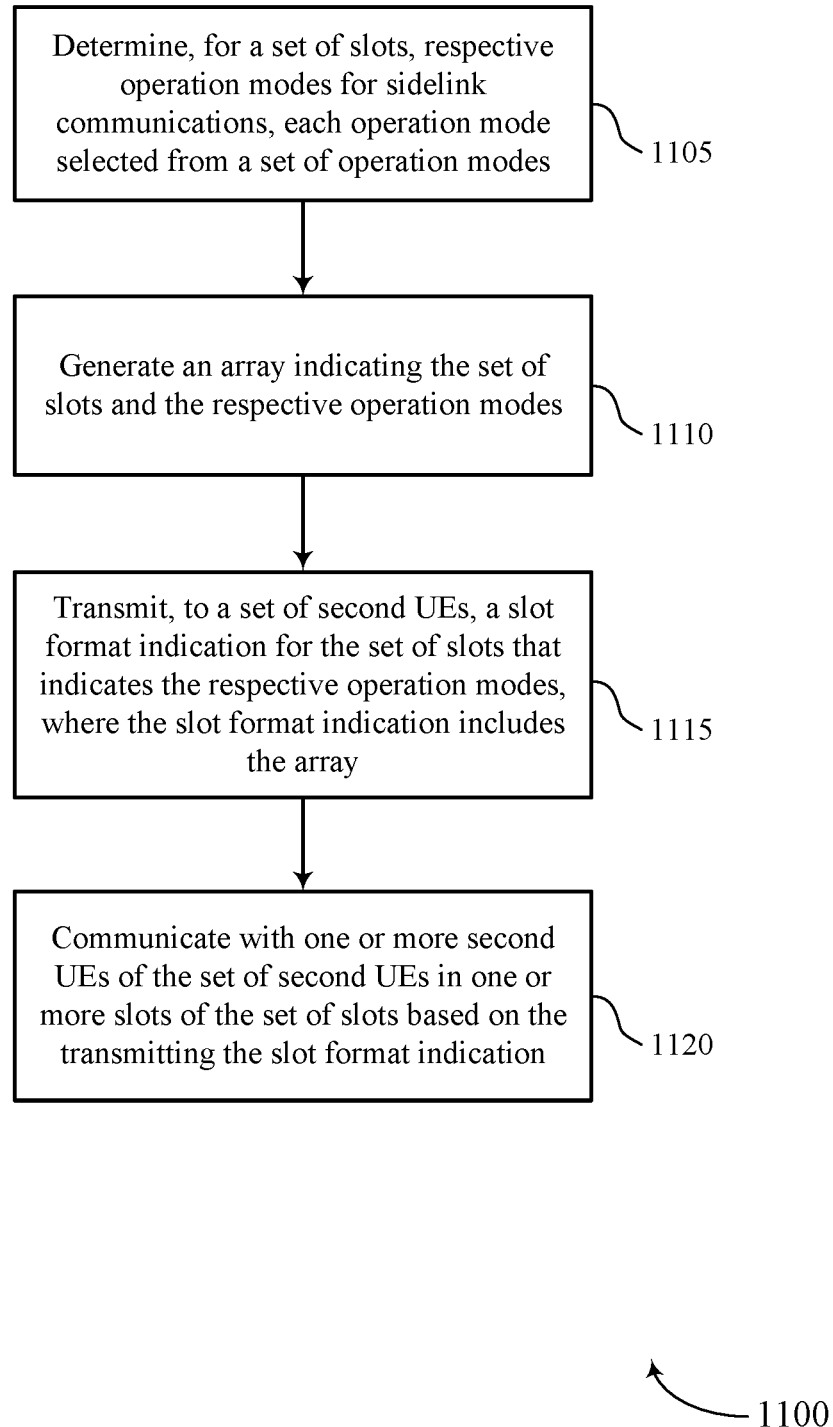

FIG. 11 shows a flowchart illustrating a method 1100 that supports micro sleep techniques in star topology sidelink communications in accordance with aspects of the present disclosure. The operations of method 1100 may be implemented by a UE 115 or its components as described herein. In one aspect, the operations of method 1100 may be performed by a communications manager as described with reference to FIGS. 6 through 9. In some aspects, a first UE may execute a set of instructions to control the functional elements of the first UE to perform the functions described below. Additionally or alternatively, a first UE may perform aspects of the functions described below using special-purpose hardware.

At 1105, the first UE may determine, for a set of slots, respective operation modes for sidelink communications, each operation mode selected from a set of operation modes. The operations of 1105 may be performed according to the methods described herein. In some aspects, aspects of the operations of 1105 may be performed by an operation mode manager as described with reference to FIGS. 6 through 9.

At 1110, the first UE may generate an array indicating the set of slots and the respective operation modes. The operations of 1110 may be performed according to the methods described herein. In some aspects, aspects of the operations of 1110 may be performed by an SFI manager as described with reference to FIGS. 6 through 9.

At 1115, the first UE may transmit, to a set of second UEs, a slot format indication for the set of slots that indicates the respective operation modes, where the slot format indication includes the array. The operations of 1115 may be performed according to the methods described herein. In some aspects, aspects of the operations of 1115 may be performed by an SFI manager as described with reference to FIGS. 6 through 9.

At 1120, the first UE may communicate with one or more second UEs of the set of second UEs in one or more slots of the set of slots based on the transmitting the slot format indication. The operations of 1120 may be performed according to the methods described herein. In some aspects, aspects of the operations of 1120 may be performed by a sidelink communication manager as described with reference to FIGS. 6 through 9.

Figure 12:
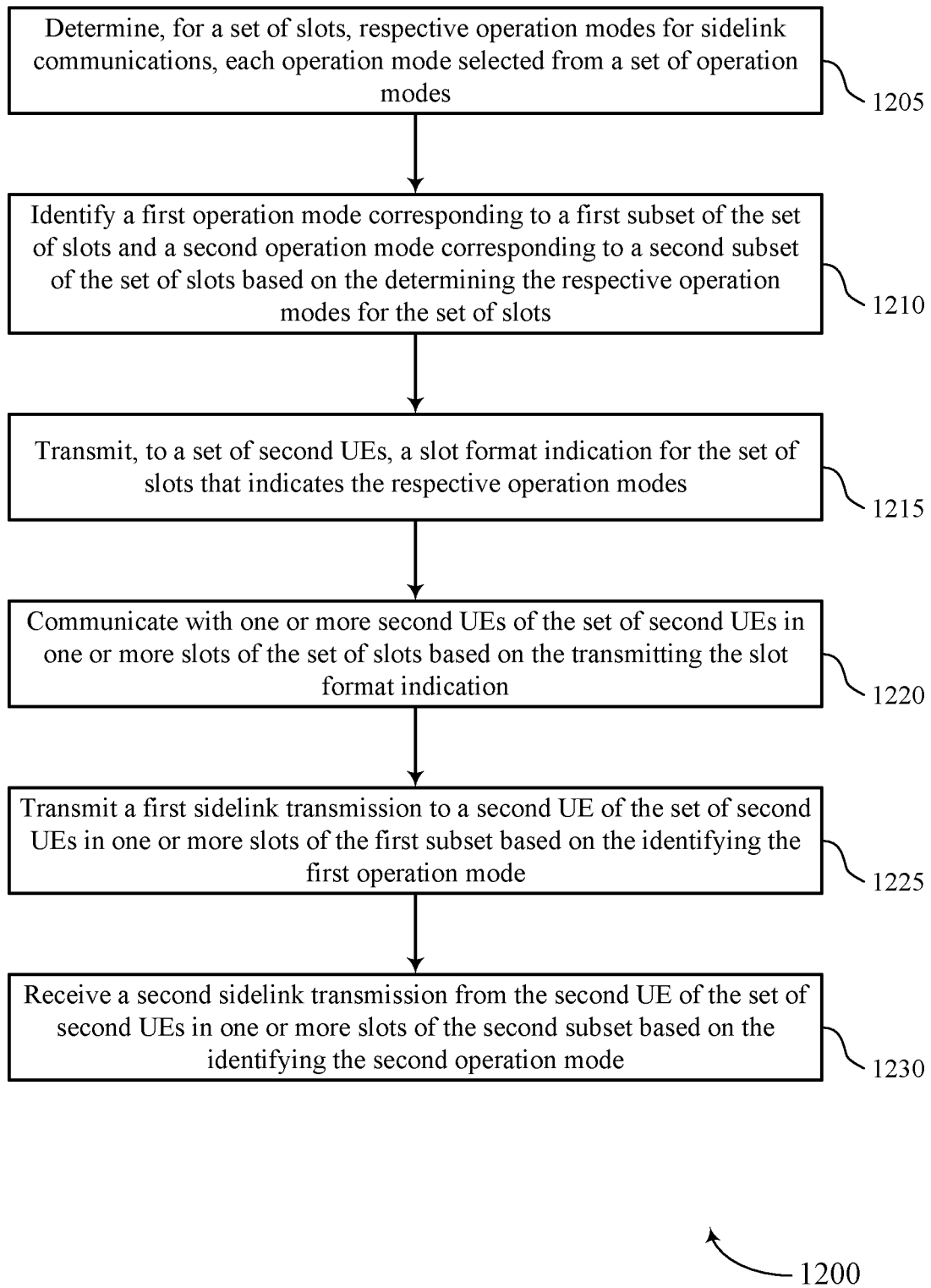

FIG. 12 shows a flowchart illustrating a method 1200 that supports micro sleep techniques in star topology sidelink communications in accordance with aspects of the present disclosure. The operations of method 1200 may be implemented by a UE 115 or its components as described herein. In one aspect, the operations of method 1200 may be performed by a communications manager as described with reference to FIGS. 6 through 9. In some aspects, a first UE may execute a set of instructions to control the functional elements of the first UE to perform the functions described below. Additionally or alternatively, a first UE may perform aspects of the functions described below using special-purpose hardware.

At 1205, the first UE may determine, for a set of slots, respective operation modes for sidelink communications, each operation mode selected from a set of operation modes. The operations of 1205 may be performed according to the methods described herein. In some aspects, aspects of the operations of 1205 may be performed by an operation mode manager as described with reference to FIGS. 6 through 9.

At 1210, the first UE may identify a first operation mode corresponding to a first subset of the set of slots and a second operation mode corresponding to a second subset of the set of slots based on the determining the respective operation modes for the set of slots. The operations of 1210 may be performed according to the methods described herein. In some aspects, aspects of the operations of 1210 may be performed by an operation mode manager as described with reference to FIGS. 6 through 9.

At 1215, the first UE may transmit, to a set of second UEs, a slot format indication for the set of slots that indicates the respective operation modes. The operations of 1215 may be performed according to the methods described herein. In some aspects, aspects of the operations of 1215 may be performed by an SFI manager as described with reference to FIGS. 6 through 9.

At 1220, the first UE may communicate with one or more second UEs of the set of second UEs in one or more slots of the set of slots based on the transmitting the slot format indication. The operations of 1220 may be performed according to the methods described herein. In some aspects, aspects of the operations of 1220 may be performed by a sidelink communication manager as described with reference to FIGS. 6 through 9.

At 1225, the first UE may transmit a first sidelink transmission to a second UE of the set of second UEs in one or more slots of the first subset based on the identifying the first operation mode. The operations of 1225 may be performed according to the methods described herein. In some aspects, aspects of the operations of 1225 may be performed by a sidelink communication manager as described with reference to FIGS. 6 through 9.

At 1230, the first UE may receive a second sidelink transmission from the second UE of the set of second UEs in one or more slots of the second subset based on the identifying the second operation mode. The operations of 1230 may be performed according to the methods described herein. In some aspects, aspects of the operations of 1230 may be performed by a sidelink communication manager as described with reference to FIGS. 6 through 9.

Figure 13:
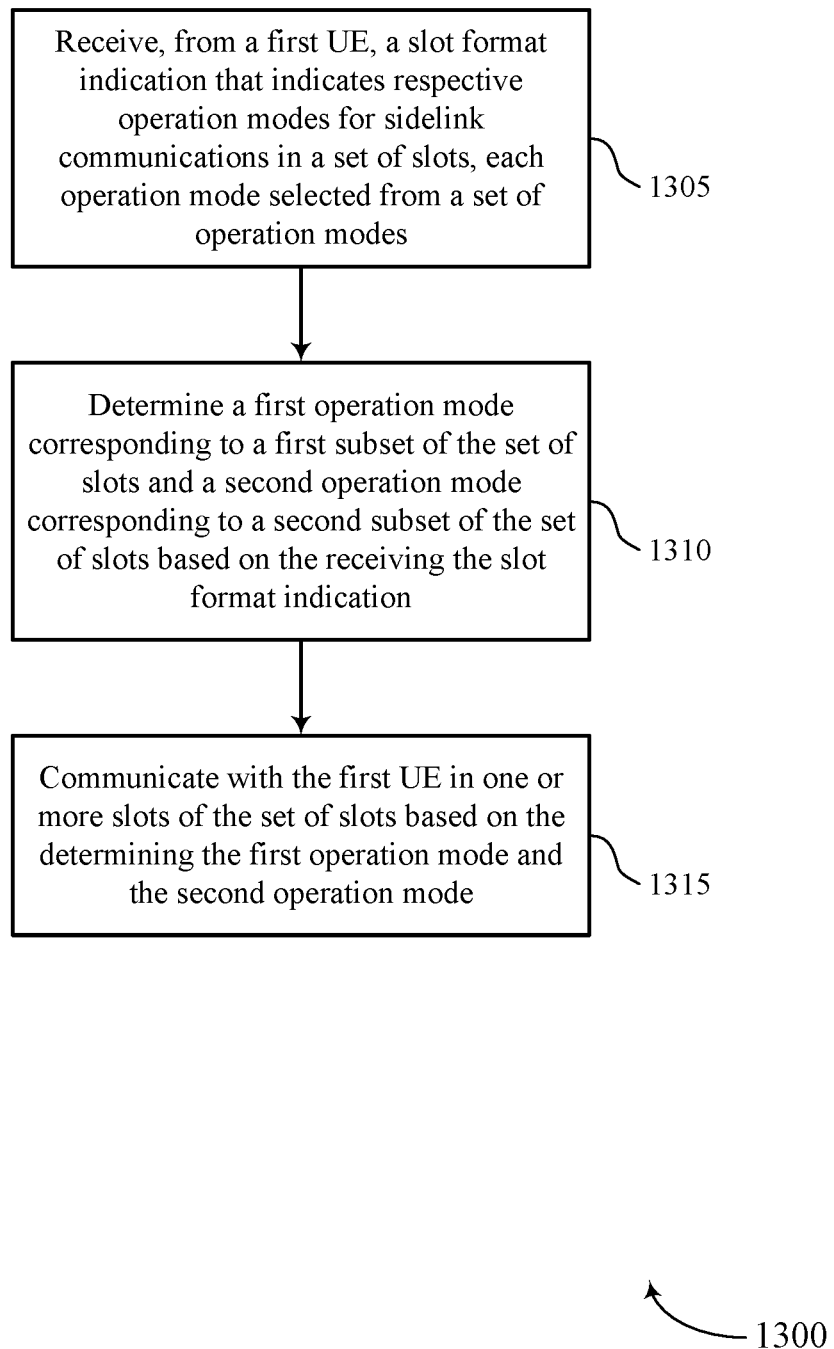

FIG. 13 shows a flowchart illustrating a method 1300 that supports micro sleep techniques in star topology sidelink communications in accordance with aspects of the present disclosure. The operations of method 1300 may be implemented by a UE 115 or its components as described herein. In one aspect, the operations of method 1300 may be performed by a communications manager as described with reference to FIGS. 6 through 9. In some aspects, a second UE may execute a set of instructions to control the functional elements of the second UE to perform the functions described below. Additionally or alternatively, a second UE may perform aspects of the functions described below using special-purpose hardware.

At 1305, the second UE may receive, from a first UE, a slot format indication that indicates respective operation modes for sidelink communications in a set of slots, each operation mode selected from a set of operation modes. The operations of 1305 may be performed according to the methods described herein. In some aspects, aspects of the operations of 1305 may be performed by an SFI manager as described with reference to FIGS. 6 through 9.

At 1310, the second UE may determine a first operation mode corresponding to a first subset of the set of slots and a second operation mode corresponding to a second subset of the set of slots based on the receiving the slot format indication. The operations of 1310 may be performed according to the methods described herein. In some aspects, aspects of the operations of 1310 may be performed by an operation mode manager as described with reference to FIGS. 6 through 9.

At 1315, the second UE may communicate with the first UE in one or more slots of the set of slots based on the determining the first operation mode and the second operation mode. The operations of 1315 may be performed according to the methods described herein. In some aspects, aspects of the operations of 1315 may be performed by a sidelink communication manager as described with reference to FIGS. 6 through 9.

The following provides an overview of aspects of the present disclosure:

Aspect 1: A method for wireless communications implemented by a first UE, comprising: transmitting, to a set of second UEs, a slot format indication for a set of slots that indicates respective operation modes for sidelink communications in a set of slots, each operation mode selected from a set of operation modes; and communicating with one or more second UEs of the set of second UEs in one or more slots of the set of slots based at least in part on the transmitting the slot format indication.

Aspect 2: The method of aspect 1, further comprising: generating an array indicating the set of slots and the respective operation modes, wherein the slot format indication comprises the array.

Aspect 3: The method of any of aspects 1 through 2, further comprising: transmitting a first sidelink transmission to a second UE of the set of second UEs in one or more slots of a first subset of the set of slots based at least in part on a first operation mode corresponding to the first subset.

Aspect 4: The method of aspect 3, further comprising: receiving a second sidelink transmission from the second UE of the set of second UEs in one or more slots of a second subset of the set of slots based at least in part on a second operation mode corresponding to the second subset.

Aspect 5: The method of any of aspects 1 through 4, wherein the transmitting the slot format indication comprises: transmitting the slot format indication in a sidelink control information message.

Aspect 6: The method of aspect 5, wherein the transmitting the slot format indication in a sidelink control information message comprises: appending the slot format indication to control information in the sidelink control information message based at least in part on determining that a modulation and coding scheme for the sidelink control information message is compatible with transmitting the slot format indication.

Aspect 7: The method of any of aspects 5 through 6, wherein the sidelink control information message comprises an indication of the slot format indication and a network identifier associated with the first UE and the set of second UEs.

Aspect 8: The method of any of aspects 1 through 7, further comprising: identifying a configured grant occasion associated with a slot of the set of slots, wherein the configured grant occasion schedules a sidelink communication with a second UE of the set of second UEs in the slot; determining a mismatch between the scheduled sidelink communication and the respective operation mode for the slot; and refraining from communicating the sidelink communication with the second UE in the slot based at least in part on the determining the mismatch.

Aspect 9: The method of any of aspects 1 through 8, further comprising: refraining from communicating with the set of second UEs in one or more slots of a third subset of the set of slots based at least in part on a third operation mode corresponding to the third subset.

Aspect 10: The method of aspect 9, further comprising: deactivating one or more transmission components at the first UE in the one or more slots of the third subset based at least in part on the identifying the third operation mode, wherein the refraining from communicating with the set of second UEs in the one or more slots of the third subset is further based at least in part on the deactivating the one or more transmission components.

Aspect 11: The method of any of aspects 1 through 10, further comprising: transmitting, to the set of second UEs, a feedback indication that indicates a fourth subset of the set of slots for feedback associated with the sidelink communications; and communicating the feedback with one or more second UEs of the set of second UEs in one or more slots of the fourth subset based at least in part on a respective operation mode for each slot of the fourth subset and the transmitting the feedback indication.

Aspect 12: The method of any of aspects 1 through 11, wherein the slot format indication for the set of slots indicates respective operation modes for a set of subbands in each slot of the set of slots.

Aspect 13: The method of any of aspects 1 through 12, wherein the transmitting the slot format indication comprises: transmitting the slot format indication in each sub-channel of a set of sub-channels.

Aspect 14: The method of any of aspects 1 through 13, wherein the transmitting the slot format indication comprises: transmitting the slot format indication in a medium access control control element, a radio resource control message, or any combination thereof.

Aspect 15: A method for wireless communications implemented by a second UE, comprising: receiving, from a first UE, a slot format indication that indicates respective operation modes for sidelink communications in a set of slots, each operation mode selected from a set of operation modes; and communicating, based at least in part on the receiving the slot format indication, with the first UE in one or more slots of the set of slots based at least in part on a first operation mode corresponding to a first subset of the set of slots and a second operation mode corresponding to a second subset of the set of slots.

Aspect 16: The method of aspect 15, wherein the slot format indication comprises an array indicating the set of slots and the respective operation modes.

Aspect 17: The method of any of aspects 15 through 16, further comprising: receiving, from the first UE, a first sidelink transmission in one or more slots of the first subset based at least in part on the first operation mode.

Aspect 18: The method of any of aspects 15 through 17, further comprising: transmitting, to the first UE, a second sidelink transmission in one or more slots of the second subset based at least in part on the second operation mode.

Aspect 19: The method of any of aspects 15 through 18, further comprising: entering a sleep mode in at least a portion of a slot of the second subset based at least in part on the second operation mode; and refraining from communicating with the first UE in at least the portion of the slot of the second subset based at least in part on the entering the sleep mode.

Aspect 20: The method of any of aspects 15 through 19, wherein the receiving the slot format indication comprises: receiving the slot format indication in a sidelink control information message.

Aspect 21: The method of aspect 20, wherein the sidelink control information message comprises an indication of the slot format indication and a network identifier associated with the first UE and the second UE.

Aspect 22: The method of any of aspects 15 through 21, further comprising: identifying a configured grant occasion associated with a slot of the set of slots, wherein the configured grant occasion schedules a sidelink communication with the first UE in the slot; determining a mismatch between the scheduled sidelink communication and the respective operation mode for the slot; and refraining from communicating the sidelink communication with the first UE in the slot based at least in part on the determining the mismatch.

Aspect 23: The method of aspect 22, further comprising: entering a sleep mode in the slot based at least in part on the determining the mismatch, wherein the refraining from communicating with the first UE in the slot is further based at least in part on the entering the sleep mode.

Aspect 24: The method of any of aspects 22 through 23, wherein the refraining from communicating with the first UE in the slot comprises: refraining from decoding the sidelink communication with the first UE in the slot based at least in part on the determining the mismatch.

Aspect 25: The method of any of aspects 15 through 24, further comprising: entering a sleep mode in at least a portion of a slot of a third subset of the set of slots based at least in part on a third operation mode corresponding to the third subset; and refraining from communicating with the first UE in at least the portion of the slot of the third subset based at least in part on the entering the sleep mode.

Aspect 26: The method of any of aspects 15 through 25, further comprising: receiving, from the first UE, a feedback indication that indicates a fourth subset of the set of slots for feedback associated with the sidelink communications; and communicating the feedback with the first UE in one or more slots of the fourth subset based at least in part on the respective operation mode for each slot of the fourth subset and the receiving the feedback indication.

Aspect 27: The method of aspect 26, wherein the communicating the feedback with the first UE comprises: refraining from communicating the feedback with the first UE in a first slot of the fourth subset based at least in part on the respective operation mode for the first slot; and communicating the feedback with the first UE in a second slot of the fourth subset based at least in part on the respective operation mode for the second slot.

Aspect 28: The method of any of aspects 15 through 27, wherein the slot format indication indicates respective operation modes for a set of subbands in each slot of the set of slots.

Aspect 29: The method of any of aspects 15 through 28, wherein the receiving the slot format indication comprises: receiving the slot format indication in one or more sub-channels of a set of sub-channels.

Aspect 30: The method of any of aspects 15 through 29, wherein the receiving the slot format indication comprises: receiving the slot format indication in a medium access control control element, a radio resource control message, or any combination thereof.

Aspect 31: An apparatus for wireless communications implemented by a first UE, comprising a processor; memory coupled with the processor; and instructions stored in the memory and executable by the processor to cause the apparatus to perform a method of any of aspects 1 through 14.

Aspect 32: An apparatus for wireless communications implemented by a first UE, comprising at least one means for performing a method of any of aspects 1 through 14.

Aspect 33: A non-transitory computer-readable medium storing code for wireless communications implemented by a first UE, the code comprising instructions executable by a processor to perform a method of any of aspects 1 through 14.

Aspect 34: An apparatus for wireless communications implemented by a second UE, comprising a processor; memory coupled with the processor; and instructions stored in the memory and executable by the processor to cause the apparatus to perform a method of any of aspects 15 through 30.

Aspect 35: An apparatus for wireless communications implemented by a second UE, comprising at least one means for performing a method of any of aspects 15 through 30.

Aspect 36: A non-transitory computer-readable medium storing code for wireless communications implemented by a second UE, the code comprising instructions executable by a processor to perform a method of any of aspects 15 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. In one aspect, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. In one aspect, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. In one aspect, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. In one aspect, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, in one aspect, a list of at least one of A, B, or C means A or B or C or AB or AC or BC or ABC (i.e., A and B and C). Also, as used herein, the phrase "based on" shall not be construed as a reference to a closed set of conditions. In one aspect, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications implemented by a second user equipment (UE), comprising:
   a processor; and
   memory coupled with the processor, wherein the memory comprises instructions executable by the processor to cause the apparatus to:
  receive, from a first UE, a slot format indication that indicates respective operation modes for sidelink communications in a set of slots, each operation mode selected from a set of operation modes; and
  communicate, based at least in part on the receiving the slot format indication, with the first UE in one or more slots of the set of slots based at least in part on a first operation mode corresponding to a first subset of the set of slots and a second operation mode corresponding to a second subset of the set of slots, wherein the second UE is operable to enter a sleep mode in at least a portion of a slot of the second subset of slots corresponding to the second operation mode based at least in part on a quantity of data associated with transmitting one or more second sidelink transmissions to the first UE being less than a threshold.

2. The apparatus of claim 1, wherein the slot format indication comprises an array indicating the set of slots and the respective operation modes.

3. The apparatus of claim 1, wherein the instructions are further executable by the processor to cause the apparatus to:
  receive, from the first UE, a first sidelink transmission in one or more slots of the first subset based at least in part on the first operation mode.

4. The apparatus of claim 1, wherein the instructions are further executable by the processor to cause the apparatus to:
  transmit, to the first UE, a second sidelink transmission in one or more slots of the second subset based at least in part on the second operation mode.

5. The apparatus of claim 1, wherein the instructions are further executable by the processor to cause the apparatus to:
  enter the sleep mode in at least the portion of the slot of the second subset based at least in part on the quantity of data associated with transmitting the one or more second sidelink transmissions to the first UE being less than the threshold and determining the second operation mode; and
  refrain from communicating with the first UE in at least the portion of the slot of the second subset based at least in part on the entering the sleep mode.

6. The apparatus of claim 1, wherein the instructions are further executable by the processor to cause the apparatus to:
  receive the slot format indication in a sidelink control information message.

7. The apparatus of claim 6, wherein the sidelink control information message comprises an indication of the slot format indication and a network identifier associated with the first UE and the second UE.

8. The apparatus of claim 1, wherein the instructions are further executable by the processor to cause the apparatus to:
  enter the sleep mode in at least a portion of a slot of a third subset of the set of slots based at least in part on a third operation mode corresponding to the third subset; and
  refrain from communicating with the first UE in at least the portion of the slot of the third subset based at least in part on the entering the sleep mode.

9. The apparatus of claim 1, wherein the instructions are further executable by the processor to cause the apparatus to:
  receive, from the first UE, a feedback indication that indicates a fourth subset of the set of slots for feedback associated with the sidelink communications; and
  communicate the feedback with the first UE in one or more slots of the fourth subset based at least in part on the respective operation mode for each slot of the fourth subset and the receiving the feedback indication.

10. The apparatus of claim 9, wherein the instructions are further executable by the processor to cause the apparatus to:
  refrain from communicating the feedback with the first UE in a first slot of the fourth subset based at least in part on the respective operation mode for the first slot; and
  communicate the feedback with the first UE in a second slot of the fourth subset based at least in part on the respective operation mode for the second slot.

11. The apparatus of claim 1, wherein the slot format indication indicates respective operation modes for a set of subbands in each slot of the set of slots.

12. The apparatus of claim 1, wherein the instructions are further executable by the processor to cause the apparatus to:
  receive the slot format indication in one or more sub-channels of a set of sub-channels.

13. The apparatus of claim 1, wherein the instructions are further executable by the processor to cause the apparatus to:
  receive the slot format indication in a medium access control control element, a radio resource control message, or any combination thereof.

14. A method for wireless communications implemented by a second user equipment (UE), comprising:
  receiving, from a first UE, a slot format indication that indicates respective operation modes for sidelink communications in a set of slots, each operation mode selected from a set of operation modes; and
  communicating, based at least in part on the receiving the slot format indication, with the first UE in one or more slots of the set of slots based at least in part on a first operation mode corresponding to a first subset of the set of slots and a second operation mode corresponding to a second subset of the set of slots, wherein the second UE is operable to enter a sleep mode in at least a portion of a slot of the second subset of slots corresponding to the second operation mode based at least in part on a quantity of data associated with transmitting one or more second sidelink transmissions to the first UE being less than a threshold.

15. The method of claim 14, further comprising:
  identifying an array indicating the set of slots and the respective operation modes, wherein the slot format indication comprises the array.

* * * * *